United States Patent
Twist et al.

(10) Patent No.: US 10,592,082 B2
(45) Date of Patent: Mar. 17, 2020

(54) PARALLEL FRONT END APPLICATION AND WORKFLOW DEVELOPMENT

(71) Applicant: Microsoft Technology Licensing, LLC, Redmond, WA (US)

(72) Inventors: Jonjo Twist, Redmond, WA (US); Prashant Kumar, Bellevue, WA (US); Stephen C. Siciliano, Bellevue, WA (US); Himanshu Agrawal, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 492 days.

(21) Appl. No.: 14/951,219

(22) Filed: Nov. 24, 2015

(65) Prior Publication Data
US 2017/0147190 A1    May 25, 2017

(51) Int. Cl.
*G06F 3/0484*    (2013.01)
*G06F 3/0486*    (2013.01)
(Continued)

(52) U.S. Cl.
CPC ........ *G06F 3/04847* (2013.01); *G06F 3/0481* (2013.01); *G06F 3/0486* (2013.01); *G06F 8/34* (2013.01); *G06F 8/38* (2013.01); *G06F 8/20* (2013.01); *G06F 8/35* (2013.01); *G06F 2203/04803* (2013.01); *G06Q 10/06* (2013.01)

(58) Field of Classification Search
None
See application file for complete search history.

(56) References Cited

U.S. PATENT DOCUMENTS 7,464,366 B2    12/2008    Shukla et al.
7,996,488 B1    8/2011    Casabella et al.
(Continued)

FOREIGN PATENT DOCUMENTS

WO    2011104367 A2    9/2011

OTHER PUBLICATIONS

"Preparation and Customizing of the Approval Workflow", Retrieved on: Aug. 3, 2015, Available at: http://help.sap.com/saphelp_dbm600/helpdata/en/04/928adf46f311d189470000e829fbbd/content.htm, 2 pages.
(Continued)

*Primary Examiner* — Toan H Vu
(74) *Attorney, Agent, or Firm* — Fiala & Weaver P.L.L.C.

(57) ABSTRACT

Methods, systems, apparatuses, and computer program products are provided for developing user applications that include workflows, and in particular, for developing the user applications and workflows in parallel. A first user interface is provided on a display screen that enables a graphical user interface (GUI) of a user application to be configured. Controls are enabled to be selected for inclusion in the GUI of the user application. Workflow logic is enabled to be associated with a control included in the GUI. A second user interface is provided on the display screen concurrent with the first user interface. The second user interface enables the workflow logic to be generated. Steps are enabled to be selected for inclusion in the workflow logic. Each step is configured to operate on data entered via the GUI and/or data of another step of the workflow logic.

20 Claims, 10 Drawing Sheets

(51) Int. Cl.
*G06F 8/38* (2018.01)
*G06F 8/34* (2018.01)
*G06F 3/0481* (2013.01)
*G06Q 10/06* (2012.01)
*G06F 8/35* (2018.01)
*G06F 8/20* (2018.01)

(56) References Cited

U.S. PATENT DOCUMENTS

| | | | | |
|---|---|---|---|---|
| 8,006,245 | B2 | 8/2011 | Chandel | |
| 8,725,548 | B2 | 5/2014 | Leitch et al. | |
| 2006/0005140 | A1* | 1/2006 | Crew | G06Q 10/06 715/760 |
| 2007/0028175 | A1 | 2/2007 | Moore et al. | |
| 2008/0028329 | A1* | 1/2008 | Erl | G06F 8/34 715/764 |
| 2009/0099871 | A1* | 4/2009 | Gadodia | G06Q 10/06 705/3 |
| 2009/0248184 | A1* | 10/2009 | Steingart | A61C 1/082 700/98 |
| 2010/0050153 | A1* | 2/2010 | Louie | G06F 8/20 717/111 |
| 2010/0106657 | A1* | 4/2010 | Hinton | G06Q 10/0633 705/301 |
| 2010/0257470 | A1* | 10/2010 | Ari | G06Q 10/06 715/764 |
| 2010/0306020 | A1* | 12/2010 | Lo | G06Q 10/06 705/7.27 |
| 2012/0159503 | A1 | 6/2012 | Shafiee et al. | |
| 2013/0152021 | A1* | 6/2013 | Hatfield | G06Q 10/0633 715/843 |
| 2013/0185240 | A1* | 7/2013 | Ward | G06F 8/34 706/47 |
| 2013/0253977 | A1* | 9/2013 | Vibhor | G06Q 10/06316 705/7.26 |
| 2014/0089825 | A1* | 3/2014 | Lee | G06F 3/048 715/762 |
| 2014/0195954 | A1* | 7/2014 | Doshi | G06F 19/321 715/771 |
| 2014/0207927 | A1* | 7/2014 | Fichtenholtz | H04L 67/16 709/223 |
| 2014/0229898 | A1* | 8/2014 | Terwedo | G06F 3/04817 715/835 |
| 2014/0282193 | A1* | 9/2014 | Bann | G05B 19/409 715/771 |
| 2014/0337071 | A1* | 11/2014 | Stiffler | G06Q 10/06311 705/7.13 |
| 2015/0261391 | A1* | 9/2015 | Herlitz | G06F 8/34 715/821 |
| 2015/0288637 | A1* | 10/2015 | Celikyilmaz | H04L 51/16 715/752 |

OTHER PUBLICATIONS

"Design A Graphical Approval Workflow", Retrieved on: Aug. 3, 2015, Available at: http://www.microsoft.com/en-us/dynamics/marketing-customer-center/Design-a-graphical-approval-workflow.aspx, 1 page.
"Managing Approval Process", Published on: Apr. 28, 2015, Available at: https://www.zoho.com/crm/help/automation/approval-process.html, 9 pages.
"Creating the Code-Free Workflow", Retrieved on: Aug. 3, 2015, Available at: http://docs.empowerid.com/dev/developinginworkflowstudio/developingworkflowapplications/codefree/creatingthecodefreeworkflow.html, 26 pages.
"Better Work Flow", Published on: Dec. 8, 2012, Available at: http://betterworkflow.electricputty.co.uk/documentation/#requirements, 9 pages.
"SYS: Workflow Setup", Retrieved on: Aug. 3, 2015, Available at: http://solutionsonline.teamsoftware.com/Content/WT_SYS_Setup/SYS_Setup_REFs/SYS_WorkflowSetup2.htm, 10 pages.
"Requests & Approvals Workflow", Retrieved on: Aug. 3, 2015, Available at: https://support.allocadia.com/hc/en-us/articles/205807218-Requests-Approvals-Workflow, 7 pages.
"Trackvia", Published on: May 1, 2015, Available at: https://www.trackvia.com/#prettyPhoto, 6 pages.
"SecondWritten Opinion Issued in PCT Application No. PCT/US2016/062379", dated Sep. 18, 2017, 5 Pages.
"International Search Report and Written Opinion Issued in PCT Application No. PCT/US2016/062379", dated Feb. 23, 2017, 11 Pages.
IFTTT, "What is IFTTT? IFTTT Gives You Creative Control Over the Products and Apps You Love." Online Available at <https://ifttt.com/wtf>, Retrieved on Jan. 20, 2016, 2 pages.
Salesforce Developers, "Lightning Overview", Online Available at <https://developersalesforce.com/lightning, Retrieved on Jan. 20, 2016, 5 pages.
Salesforce, "Everything You Need to Build Apps, Fast.", Multi Platform App Development: Business Automation-Salesforce.com, Online Available at <http://www.salesforce.com/platform/services/>, Retrieved on Jan. 20, 2016, 2 pages.
Microsoft Azure, "Provides an Overview of Azure Features, Services, and Common Uses.", Online Available at <https://azure.microsoft.com/en-us/documentation/infographics/azure/>, Retrieved on Jan. 20, 2016, 3 pages.
Microsoft, "Microsoft Project Siena (Beta)", Unlock the Business Potential of Mobile Devices, Online Available at <http://www.microsoft.com/en-us/projectsiena/default.aspx>, Retrieved on Jan. 20, 2016, 2 pages.
"International Preliminary Report on Patentability Issued in PCT Application No. PCT/US2016/062379", dated Feb. 13, 2018, 8 Pages.

\* cited by examiner

702

Enable selection of a step for inclusion in the workflow logic from a library of steps, the steps including one or more network-based applications and one or more client applications

PARALLEL FRONT END APPLICATION AND WORKFLOW DEVELOPMENT

BACKGROUND

A business or enterprise application is a computer program used by business users to perform various business functions. Business applications are frequently developed when available off-the-shelf software does not completely address the desired functionality. Many business applications are interactive, having a graphical user interface (GUI) into which users can input data, use to submit data queries, use to perform operations, and/to use to view results. Consumer applications are less business focused, instead being focused on the needs of the consumer.

Business and consumer users tend to depend on information technology (IT) personnel to code their applications due to application complexity, and the programming expertise required. Merely designing an application to pull data from a remote source (e.g., a cloud service) is difficult, typically requiring an experienced software developer.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for developing user applications that include workflows, and in particular, for developing the user application graphical user interfaces (GUIs) and workflows in parallel. A first user interface is provided on a display screen that enables a GUI of a user application to be configured. Controls are enabled to be selected for inclusion in the GUI. Workflow logic is enabled to be associated with a control included in the GUI. A second user interface is provided on the display screen concurrent with the first user interface that enables the workflow logic to be generated. Steps are enabled to be selected for inclusion in the workflow logic. Each step of the workflow logic is configured to operate on data entered via the GUI of the user application and/or data of another step of the workflow logic.

Further features and advantages of the invention, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIGS. 5, 6, 8-10, 12, 14, and 16 shows views of a GUI in various phases of parallel user application and workflow development, according to example embodiments.

Figures 7, 8:
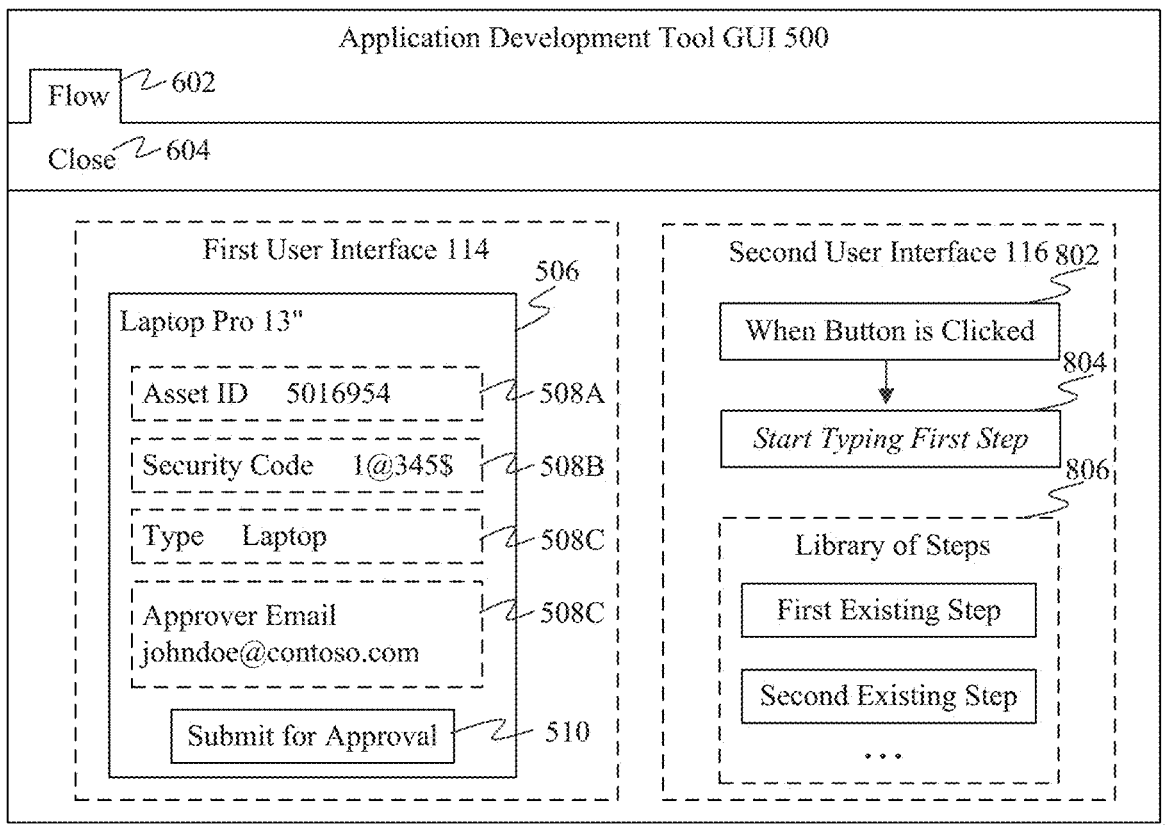

FIG. 7 shows a process for selecting a workflow step, according to an example embodiment.

Figure 11:
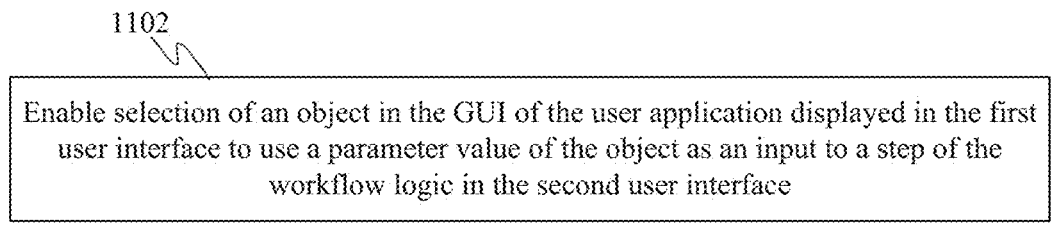

FIG. 11 shows a process for enabling an object to be used as input data to a step in a workflow development interface, according to an example embodiment.

Figure 13:
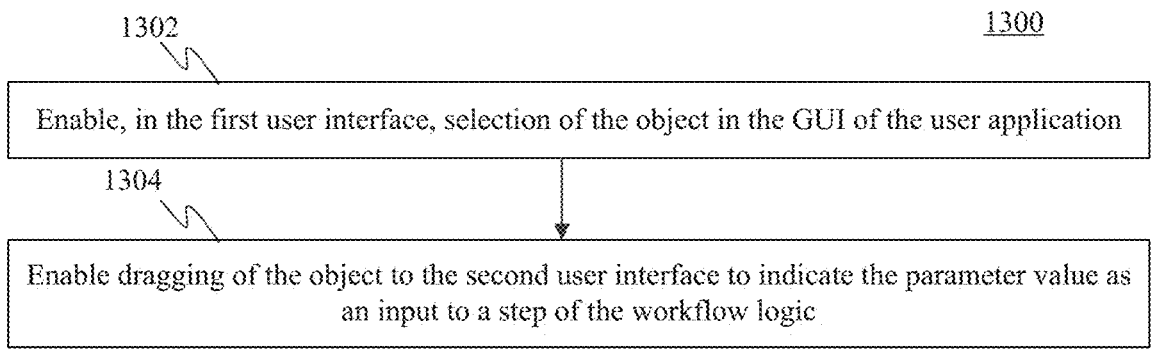

FIG. 13 shows a flowchart providing a process for dragging an object from a user interface for application development into an input data field in a user interface for workflow development, according to an example embodiment.

Figure 15:
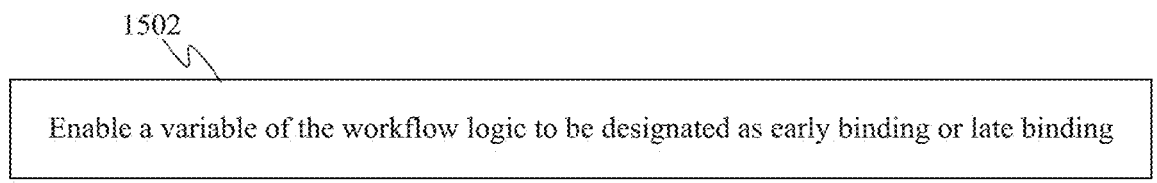

FIG. 15 shows a process for designating a type of binding for input data to a workflow, according to an example embodiment.

Figure 17:
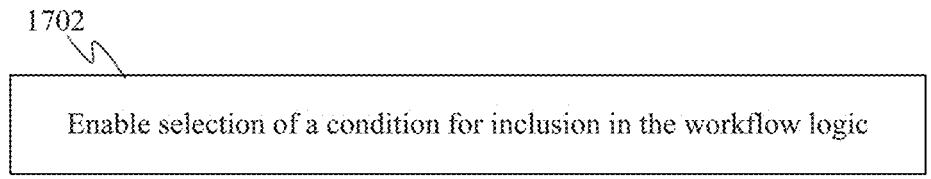

FIG. 17 shows a process for incorporating a condition into a workflow, according to an example embodiment.

Figure 18:
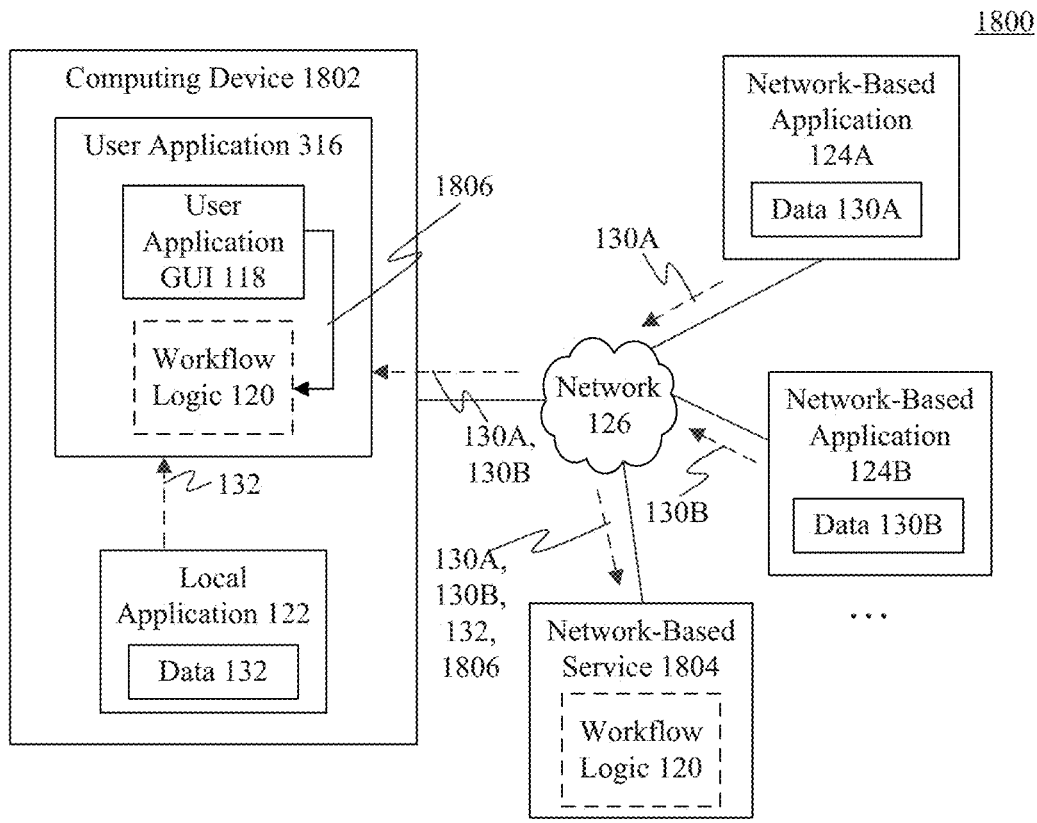

FIG. 18 shows a block diagram of a system for operating a user application that includes one or more workflows, according to an example embodiment.

Figure 19:
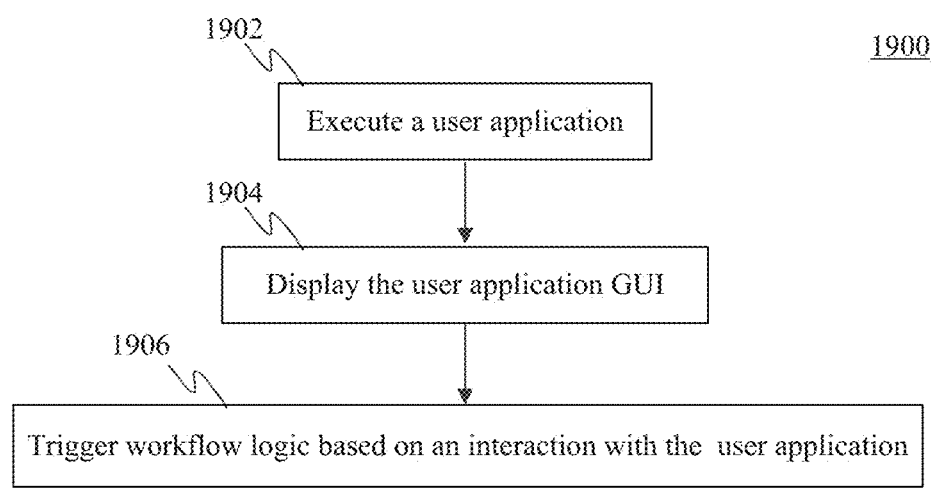

FIG. 19 shows a flowchart providing a process for executing a user application that includes one or more workflows, according to an example embodiment.

Figure 20:
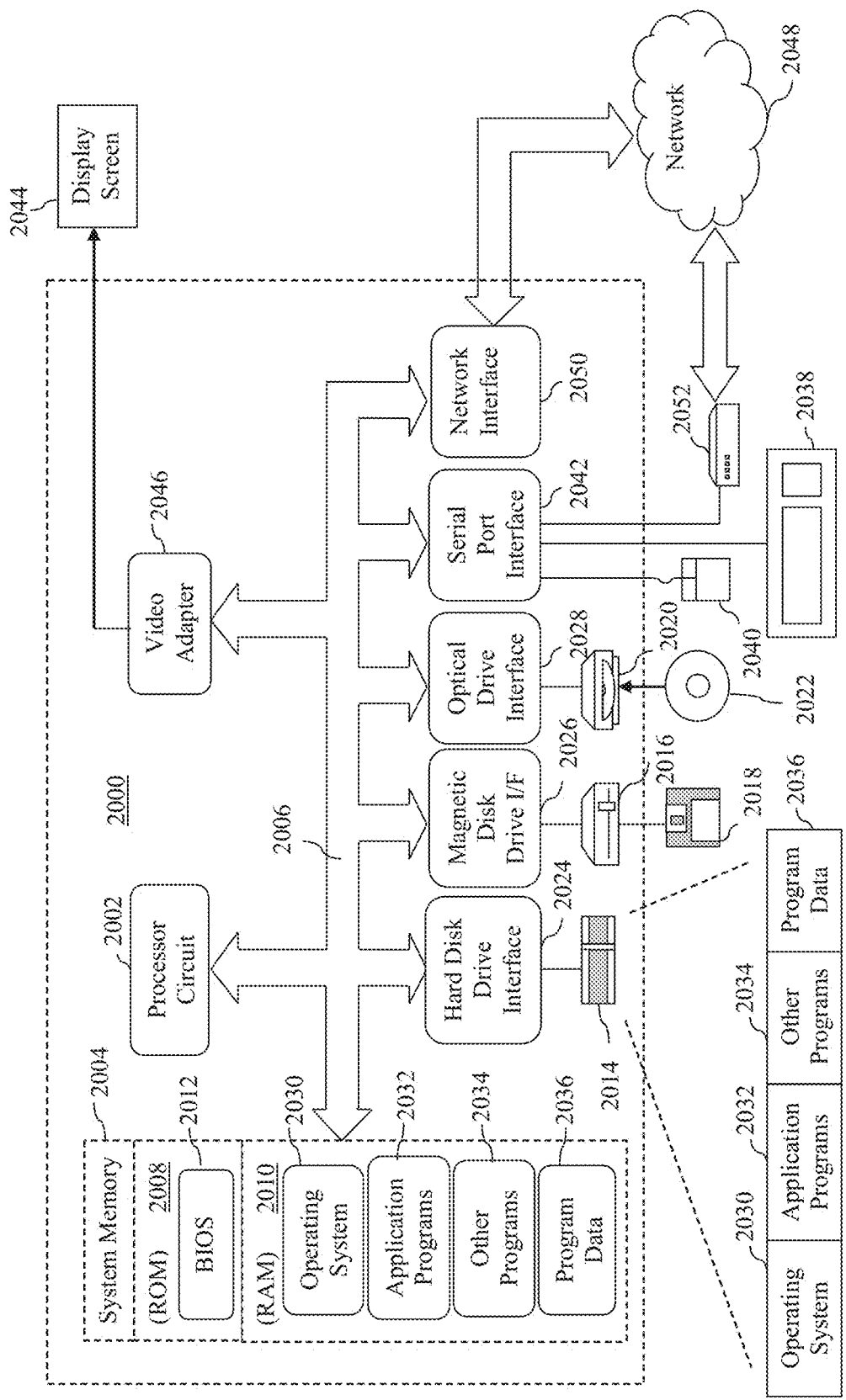

FIG. 20 shows a block diagram of an example computing device that may be used to implement embodiments.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments for User Application Development With Workflows

Business applications and consumer applications typically are created when available off-the-shelf software does not completely address the desired functionality. Many business and consumer applications are interactive, having a graphical user interface (GUI) into which users can input data, use to submit data queries, use to perform operations, and/to use to view results.

Users tend to depend on information technology (IT) personnel to code their applications due to application complexity and the programming expertise required. For instance, configuring an application to pull data from a source of interest to enterprises or consumers (e.g., data from an SQL (structured query language) database, customer relationship information from Salesforce.com of San Francisco, Calif., social network information from Facebook® operated by Facebook, Inc. of Palo Alto, Calif., or Twitter® operated by Twitter, Inc. of San Francisco, Calif.) is a difficult process.

Embodiments enable easier development of user applications, including business applications and consumer applications. Users are enabled to develop user applications without having to be expert programmers. A user is enabled to configure a GUI for a user application, and to create workflows that are executed by the user application, by interacting with user interfaces provided by an application development tool. A first user interface enables the user to configure the GUI for the user application, while a second user interface enables the user to generate workflows. To generate workflows, for instance, the user may be enabled to pick-and-choose workflow steps, sequence the steps, and configure input data for the steps. The first and second interfaces are provided adjacent to each other (e.g., side-by-side) for a seamless experience. For example, the user may be enabled to drag objects from one of the user interfaces to drop in the other, thereby taking advantage of the concurrent display of the first and second user interfaces on a display screen.

In an embodiment, a control (e.g., a user interface element) may be placed by the user in the user application GUI. The control may be configured to execute a workflow created by the user. Each step of the workflow may be configured with input data from prior workflow steps and/or data from the user application GUI. The workflow is executed when a user interacts with the associated control in the user application GUI.

In one illustrative scenario, embodiments provide a single seamless experience where a user can build an application that enables the user (or other users) to take orders (e.g., inputting order data into the user application GUI). Workflow logic is triggered on the orders that runs locally or in "the cloud" (remotely, over a network) when the user interacts with a displayed control (e.g., clicking a button). A notification may be received by the user application from an application that is accessed during the workflow to indicate an acceptance of an order, a rejection of an order, provide response data, and/or indicate other performed operation or function.

Accordingly, embodiments enable the designing of a front-end application (the user application GUI) and back-end logic (workflow logic) on the same design surface (e.g., simultaneously displayed on the same screen). Furthermore, embodiments enable the workflow logic to be intuitively associated with a control displayed on the screen by the front-end application. Still further, embodiments enable passing of data from the front-end application to the back end logic.

Example embodiments are described in the following sections for concurrent development of user application GUIs and workflows, and for runtime behavior of the resulting user applications. In the following description, a person that develops a user application using the techniques described herein is referred to as a "developer," to be distinguished from a person that uses the user application at runtime (a "user" or "end user"). It is noted, however, that a "developer," as referred to herein, does not need to have expertise in computer programming. The embodiments described herein enable application development without special programming skills.

A. Example Development Time Embodiments

Figure 1:
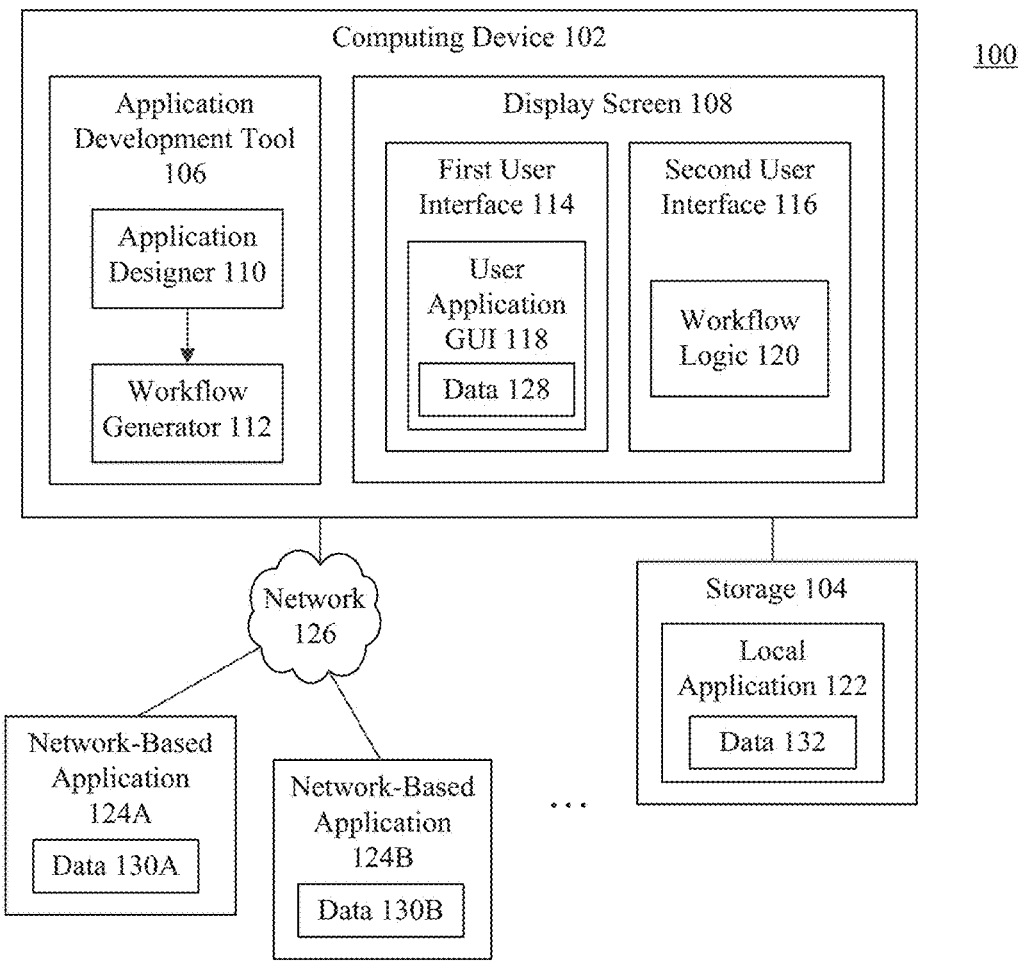
FIG. 1 shows an application development system configured for parallel development of user application GUIs and workflows, according to an example embodiment.

Parallel development of user application GUIs and workflows may be enabled in various ways. For instance, FIG. 1 shows an application development system 100, according to an example embodiment. As shown in FIG. 1, system 100 includes a computing device 102, storage 104, a first network-based application 124A, and a second network-based application 124B. Computing device 102 includes an application development tool 106 and a display screen 108. Application development tool 106 includes an application designer 110 and a workflow generator 112. Storage 104 stores a local application 122. System 100 is described as follows.

Computing device 102 may be any type of stationary or mobile computing device, including a mobile computer or mobile computing device (e.g., a Microsoft® Surface® device, a laptop computer, a notebook computer, a tablet computer such as an Apple iPad™, a netbook, etc.), a wearable computing device (e.g., a head-mounted device including smart glasses such as Google® Glass™, etc.), or a stationary computing device such as a desktop computer or PC (personal computer).

Local application 122 in storage 104 is an example of an application accessible by computing device 102 without communicating over a network. Local application 122 may be configured to perform data processing and/or data hosting operations when executed by a processor of computing device 102, and may provide data 132 to user applications created by application development tool 106 during runtime of those user applications. Local application 122 may be any type of local application/service, such as a database application (e.g., QuickBooks®, a Microsoft® Excel® spreadsheet), a messaging application (e.g., Microsoft® Outlook®), a productivity application (e.g., Microsoft® Word®, Microsoft® PowerPoint®, etc.), or another type of application. Although FIG. 1 shows a single local application, any number of local applications may be present at computing device 102, including numbers in the tens, hundreds, or greater numbers.

First and second network-based applications 124A and 124B are examples of network-based applications, also referred to as "cloud" applications or services. Network-based applications 124A and 124B are accessible by computing device 102 over network 126, may be configured to perform data processing and/or data hosting operations, and may provide data 130A and 130B, respectively, to user applications created by application development tool 106 during runtime of those user applications. Network-based applications 124A and 124B may each be any type of web accessible applications/services, such as database applications, social networking applications, messaging applications, financial services applications, news applications, search applications, web-accessible productivity applications, cloud storage and/or file hosting applications, etc. Examples of such applications include a web-accessible SQL (structured query language) database, Salesforce.com™, Facebook®, Twitter®, Instagram®, Yammer®, LinkedIn®, Yahoo!® Finance, The New York Times® (at www.nytimes.com), Google search, Microsoft® Bing, Google Docs™, Microsoft® Office 365, Dropbox™, etc. Although FIG. 1 shows two network-based applications, any number of network-based applications may be accessible over network 126, including numbers in the tens, hundreds, or greater numbers.

Note that data 128, data 130A, data 130B, and data 132 may each include any type of data, including messages, notifications, calculated data, retrieved data, and/or any other type of information requested or usable by a user application.

Computing device 102 may include at least one network interface that enables communications with network-based applications 124A and 124B over network 126. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein. Examples of network 126 include a local area network (LAN), a wide area network (WAN), a personal area network (PAN), and/or a combination of communication networks, such as the Internet.

Application development tool 106 is configured to be operated/interacted with by a developer to create user applications. Application development tool 106 includes application designer 110 and workflow generator 112. Although application designer 110 and workflow generator 112 are shown in FIG. 1 as being implemented on computing device 102, in other embodiments, one or both of application designer 110 and workflow generator 112 (or portions thereof) may be implemented by a remote service that is accessible over a network (e.g., may be implemented in "the cloud").

Application designer 110 is configured to generate a first user interface 114 displayed in display screen 108. First user interface 114 is interacted with by a developer to generate a user application GUI 118. User application GUI 118 may be created to display information, provide inputs for data, and display interactive controls. When generating user application GUI 118, the developer may configure a control (a user interface element) to trigger workflow logic 120 during runtime. As such, application designer 110 may invoke workflow generator 112 to generate a second user interface 116 displayed in display screen 108. Second user interface 116 is interacted with by the developer to generate workflow logic 120. For example, the developer may insert and sequence a plurality of workflow steps in workflow logic 120, with one or more of the steps being associated with a local or network-based application. When completed, the user application may be packaged by application development tool 106 to include user application GUI 118 and workflow logic 120. The user application may subsequently be invoked at runtime by an end user.

During runtime of the user application, workflow logic 120 may be triggered by user application GUI 118 (e.g., by a user interacting with a control in user application GUI 118), invoking operation of one or more local or network-based applications associated with the workflow steps of workflow logic 120. Each workflow step may receive input data 128 from user application GUI 118, data 132 from local application 122, data 130A or data 130B from one or both of local or network-based applications 124A and 124B, and/or data from another workflow step of workflow logic 120.

Figure 2:
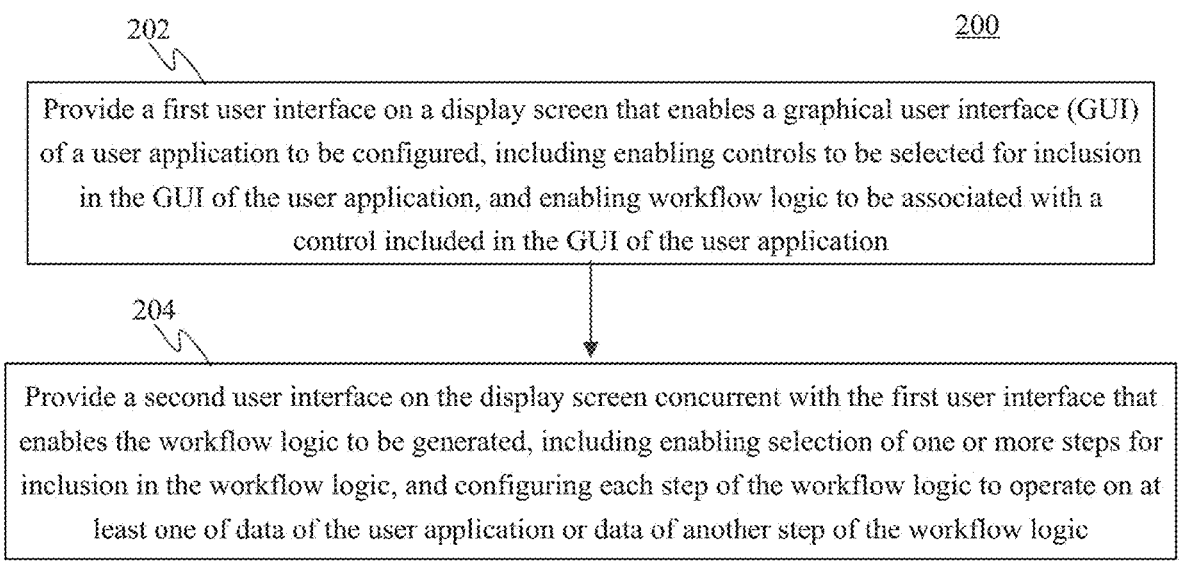
FIG. 2 shows a flowchart providing a process for parallel development of user application GUIs and workflows, according to an example embodiment.
Figure 3:
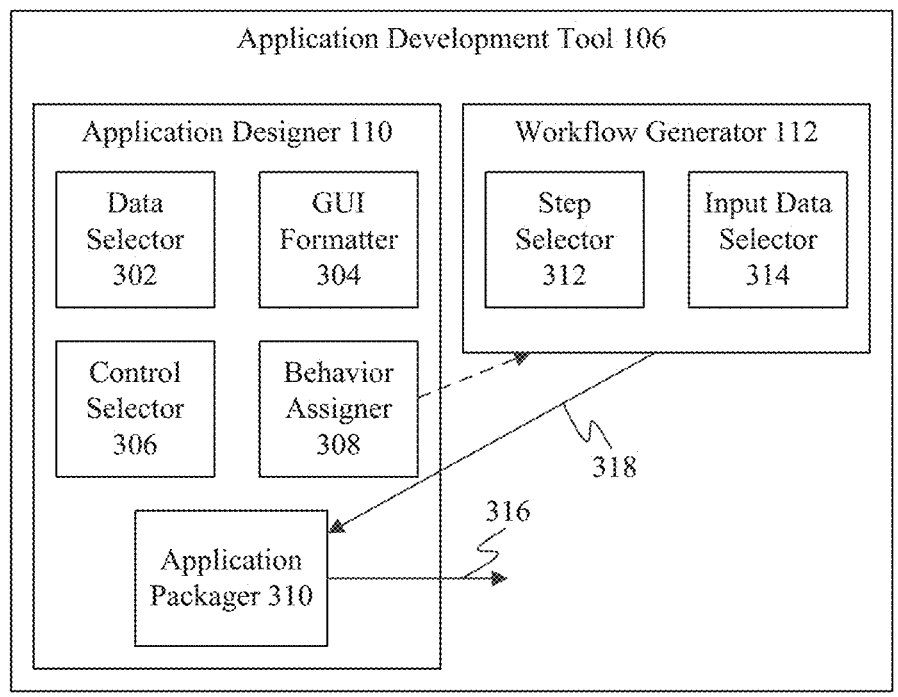
FIG. 3 shows a block diagram of an application development tool configured for parallel development of user application GUIs and workflows, according to an example embodiment.
Figure 4:
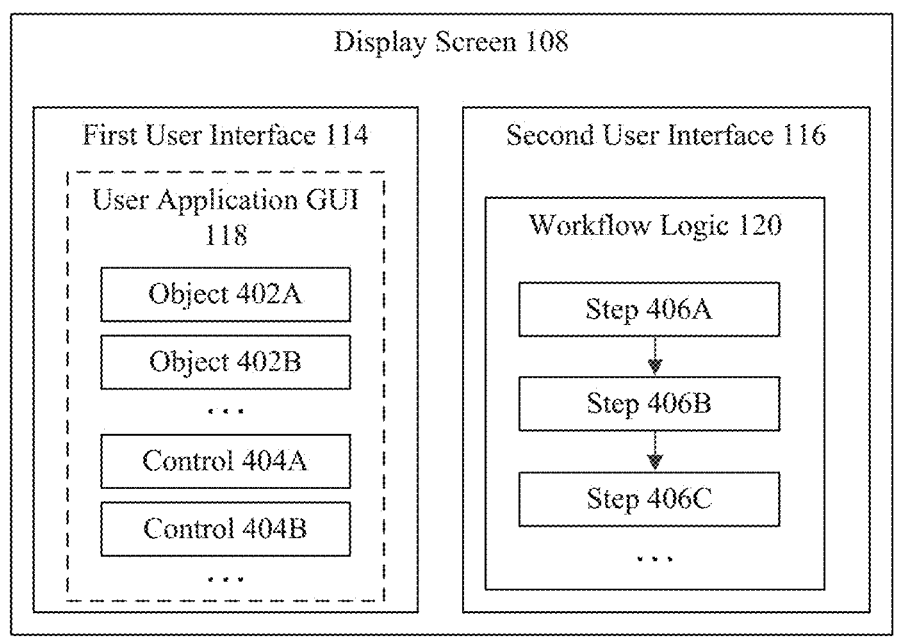
FIG. 4 shows a block diagram of a display screen illustrating user interfaces for parallel user application GUI and workflow development, according to an example embodiment.

Application development tool 106 may operate in various ways, to enable development of a user application. For instance, in embodiments, application development tool 106 may operate according to FIG. 2. FIG. 2 shows a flowchart 200 providing a process for parallel development of a user application GUI and workflows, according to an example embodiment. Flowchart 200 and application development tool 106 are described as follows with respect to FIGS. 3 and 4. FIG. 3 shows a block diagram of application development tool 106, according to an example embodiment. As shown in FIG. 3, application development tool 106 includes application designer 110 and workflow generator 112. Application designer 110 includes a data selector 302, a GUI formatter 304, a control selector 306, a behavior assigner 308, and an application packager 310. Workflow generator 112 includes a step selector 312 and an input data selector 314. FIG. 4 shows a block diagram of display screen 108, illustrating examples of first and second user interfaces 114 and 116, according to an example embodiment. FIGS. 1-4 are further described as follows.

Flowchart 200 of FIG. 2 begins with step 202. In step 202, a first user interface is provided on a display screen that enables a graphical user interface (GUI) of a user application to be configured, including enabling controls to be selected for inclusion in the GUI of the user application, and enabling workflow logic to be associated with a control included in the GUI of the user application. As described above, application designer 110 may generate first user interface 114 on display screen 108. Application designer 110 enables a developer to generate a user application by interacting with first user interface 114. For instance, application designer 110 enables the developer to generate user application GUI 118.

With reference to FIG. 3, application designer 110 may display controls for data selector 302, GUI formatter 304, control selector 306, behavior assigner 308, and application packager 310. Examples of these controls (and any other controls mentioned herein) include graphical user interface elements such as a file navigator, a push button, a pull down menu, a pop-up menu, a radio button, a slider, a text entry box, any another other suitable type of user interface element. The controls provided by application designer 110 may be interacted with in any manner by a developer or end user, including by typing, mouse click, touch, voice, gesture, finger hover, and/or by other interaction type.

Data selector 302 enables a developer to select an input source of data for the user application to be loaded at runtime, if such an input source is used. For example, the developer may be enabled to indicate a Microsoft® Excel® spreadsheet, a database, a file, etc., to be loaded at runtime. Alternatively, or additionally, during runtime, data may be input directly into user application GUI 118 by the end user (e.g., by typing, by voice, etc.).

GUI formatter 304 enables the developer to position and arrange input data objects in user application GUI 118 in any manner, and to format the data objects. For example, GUI formatter 304 may enable the developer to select a data object (e.g., by touch, mouse click, etc.), reposition the data object, and set font size, font style, font color, etc., using one or more controls.

In FIG. 4, objects 402A and 402B are example data objects that each include one or more parameters. Any number of objects may be present. GUI formatter 304 enables the developer to position objects 402A, 402B, etc. in user application GUI 114, as well as format the display of objects 402A, 402B, etc.

Control selector 306 of FIG. 3 enables the developer to select and position one or more controls in user application GUI 118. For instance, the developer may select and place a control from a display of available controls (e.g., by touch, mouse click, etc.).

Behavior assigner 308 enables the developer to assign behaviors (actions) to the controls added in user application GUI 118 by control selector 306. For instance, behavior assigner 308 may display the available behaviors in a pop-up list, a section of a ribbon, a menu, or in another manner. The developer may select a behavior from the displayed behaviors (e.g., by touch, mouse click, etc.). As one option, behavior assigner 308 may enable the developer to assign a workflow to a control as a behavior. The workflow may be an existing workflow, or the developer may select to create a new workflow. During runtime, when a user interacts with the control, the assigned workflow is triggered to operate.

For example, control selector 306 may enable controls 404A, 404B, etc. shown in FIG. 4 to be inserted into user application GUI 114. Any number of controls may be inserted. Behavior assigner 308 enables a behavior to be assigned to each of the inserted controls.

Referring back to FIG. 2, in step 204, a second user interface is provided on the display screen concurrent with the first user interface that enables the workflow logic to be generated, including enabling selection of one or more steps for inclusion in the workflow logic, and configuring each step of the workflow logic to operate on at least one of data of the user application or data of another step of the workflow logic. As described above, workflow generator 112 may generate second user interface 116 on display screen 108. Workflow generator 112 enables a developer to generate workflow logic 120 by interacting with second user interface 116.

With reference to FIG. 3, to design workflow logic 120 for a user application, workflow generator 112 may display controls for step selector 312 and input data selector 314. Examples of such controls are mentioned elsewhere herein. Step selector 312 enables a developer to select steps for inclusion in the workflow logic, and to order the steps. Step selector 312 may display workflow steps for selection in a list, a pull-down menu, or in another manner. The developer may select and place a step from the displayed steps (e.g., by touch, mouse click, etc.). For example, step selector 312 may enable a developer to select a step that is associated with a local application, such as Microsoft® Outlook®, or a network-based application, such as Facebook®. Step selector 312 enables the steps to be chained together in a sequence, optionally with conditional steps, to create workflow logic 120.

Input data selector 314 enables a developer to configure the input data for each step. For example, the developer may type or otherwise enter input data into a text input box or other data input element of a workflow step. In another example, the developer may configure an output of a prior step to be input data for a step. In still another example, input data selector 314 may enable a developer to select an object in user application GUI 118 (in first user interface 114) to be an input to a step of workflow logic 120 (in second user interface 116). Input data selector 314 may enable objects to be copied and pasted, dragged and dropped, or otherwise entered copied from user application GUI 118 into inputs of workflow logic 120.

For example, as shown in FIG. 4, workflow generator step selector 312 may enable steps 406A, 406B, and 406C to be selected for insertion into workflow logic 120. Any number of steps may be inserted. Input data selector 314 enables input data to be assigned to the inputs of each of the inserted steps.

Referring back to FIG. 3, application packager 310 is configured to package and generate an output user application 316 that includes user application GUI 118 and workflow logic 120 when they are finished being created. For example, application packager 310 may package user application 316 in the form of an executable file, a zip file, or other form, that may be executed in a standalone fashion, may be executed in a browser, or may be executed in another manner, depending on the particular type of user application being generated.

Accordingly, flowchart 200 and application development tool 106 enable a developer to create user application GUIs and workflows side-by-side. FIGS. 5-17, which are described as follows, show further example aspects of flowchart 200 and application development tool 106, including views of example tool windows, and example processes for parallel user application and workflow development.

Figure 5:
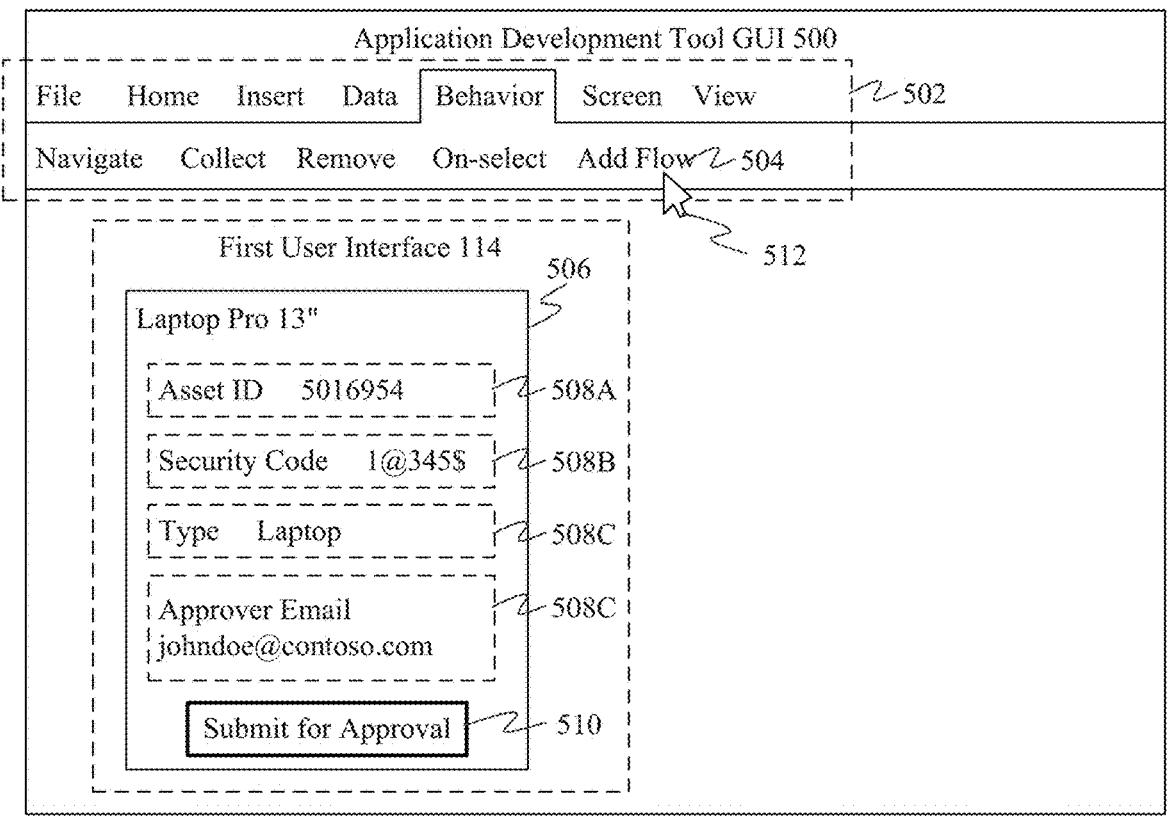

For example, FIG. 5 shows a view of an example application development tool (ADT) GUI 500. ADT GUI 500 is displayed on a display screen (e.g., display screen 108) and enables a user application to be configured. As shown in FIG. 5, ADT GUI 500 includes an example set of controls 502 and an example of first user interface 114. As described above, first user interface 114 enables a user application GUI to be generated (step 202 in FIG. 2). Controls 502 are used by a developer to build a user application GUI in first user interface 114. Note that the example of controls 502 shown in FIG. 5 is provided for purposes of illustration, and is not meant to be limiting.

As shown in FIG. 5, controls 502 includes a tabbed ribbon, where each tab can be selected to display a corresponding toolbar bearing selectable GUI elements. The tabbed ribbon includes tabs of "File," "Home," "Insert," "Data," "Behavior," "Screen," and "View." Controls 502 may be interacted with to configure a user application GUI 506 displayed in first user interface 114. For example, "File" may contain controls that enable opening and saving a user application development project. "Home" may contain editing/formatting controls for user application GUI 506 (e.g., GUI formatter 304). "Insert" contains controls for placement in user application GUI 506 (e.g., control selector 306). "Data" may be interacted with to configure sources of input data for the user application (e.g., data selector 302). "Behavior" may be interacted with to assign behaviors to controls (e.g., behavior assigner 308). "Screen" and "View" may provide controls enabling various views of the user application being developed.

First user interface 114 displays user application GUI 506. User application GUI 506 is an example GUI being developed for a user application that processes orders, and is shown for purposes of illustration. User application GUIs may include any configuration of data objects and controls, and may be configured in the form of any number of forms, views, pages, etc. During runtime, user application GUI 506 is populated with data of an order automatically (e.g., from a file) or manually (e.g., by a user typing, by voice, etc.).

As shown in FIG. 5, user application GUI 506 includes various data objects, including a title field and objects 508A-508D, and displays a control 510. For illustrative purposes, each of objects 508A-508D is populated with example data related to an example order titled "Laptop Pro 13". A developer using ADT GUI 500 interacts with controls 502 to design user application GUI 506, including selecting and positioning the title, objects 508A-508D, and control 510.

The developer has labeled control 510, "Submit for Approval." The developer may desire that during runtime, the order populating user application GUI 506 can be submitted for approval to a person indicated by object 508C (e.g., johndoe@contoso.com"). As such, the developer may desire to assign this behavior to control 510.

In FIG. 5, control 510 has been selected by the developer (as indicate by the darkened outline of control 510). After selecting control 510, "Behavior" in controls 502 is selected by the developer, resulting in an example set of behavior options being displayed. The behavior options include "Navigate," "Collect," "Remove," On-select," and "Add Flow" (add flow behavior 512). The developer may select add flow behavior 512 (e.g., using pointer 512, by touch, by voice, etc.) to assign a workflow to control 510.

Figure 6:
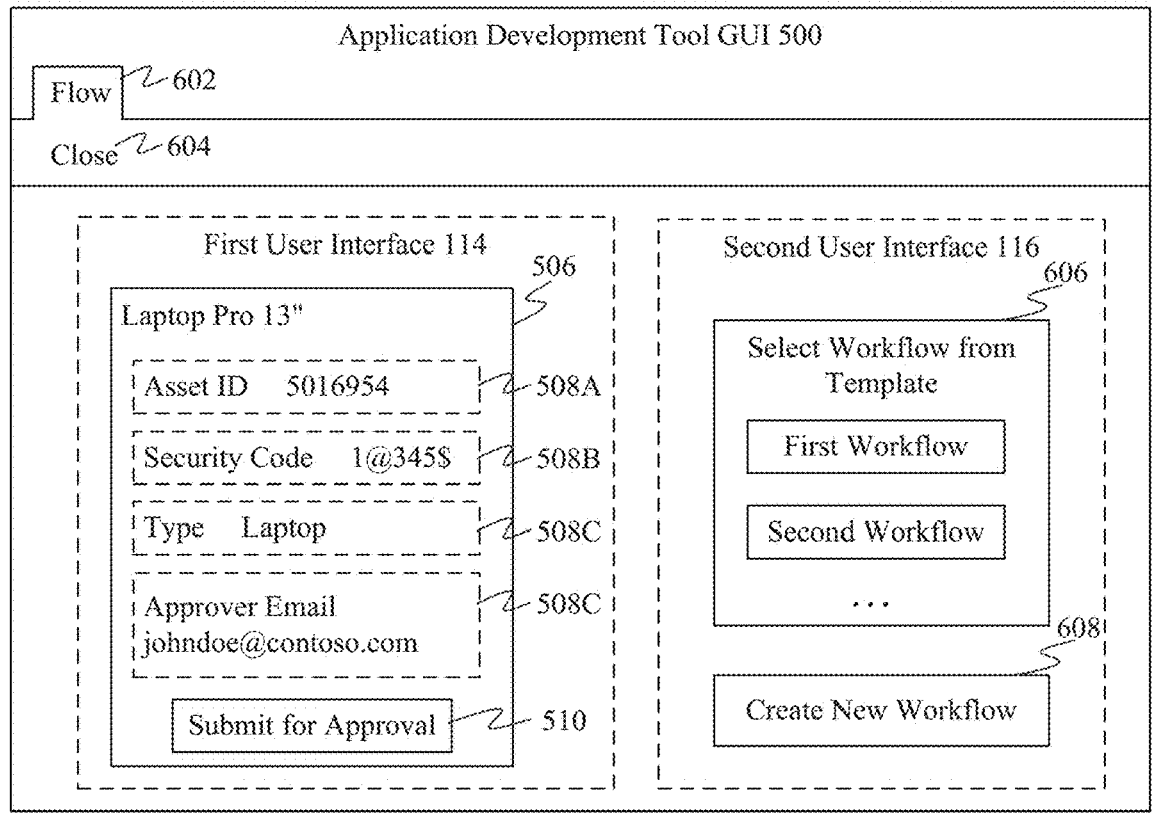

For instance, FIG. 6 shows an example view of ADT GUI 500 after the developer has elected to assign a workflow to control 510. As shown in FIG. 6, in response to selecting add flow behavior 512, second user interface 116 is provided in ADT GUI 500 side-by-side with first user interface 114 (as in step 204 of flowchart 200 in FIG. 2). First user interface 114 is unchanged in FIG. 6 (and in FIGS. 8-10, 12, 14, and 16) relative to FIG. 5. Furthermore, in FIG. 6 (and in FIGS. 8-10, 12, 14, and 16), controls 502 are replaced by a workflow tab 602 that includes a "Close" option (close option 604). Workflow tab 602 is a tab of ADT GUI 500 under which workflows may be developed.

Note that although shown side-by-side in FIG. 6, first and second user interfaces 114 and 116 may be displayed in ADT GUI 500 with any spatial relationship, including a top-bottom arrangement, etc.

In FIG. 6, second user interface 116 enables the developer to select an existing workflow for assignment to control 510, or to create a new workflow for assignment to control 510. As shown in FIG. 6, second user interface 116 displays a first control 606 and a second control 608. First control 606 may be interacted with by the developer to select an existing workflow from a list that includes a first workflow, a second workflow, etc. The developer may use a selected workflow as a template for further workflow development, or may use the selected workflow "as-is." Alternatively, the developer may interact with second control 608 to create a new workflow. The developer may interact with first and second controls 606 and 608 in any manner (e.g., using a pointer click, by touch, by voice, etc.).

FIGS. 7-17 are described as follows under the assumption that the developer interacted with second control 608 to create a new workflow. However, FIGS. 7-17 are also applicable to the developer electing to modify an existing workflow.

After the developer interacts with second control 608 to initiate creating a new workflow, second user interface 116 changes into an interface for workflow development, where workflow steps can be inserted, sequenced, and configured. FIG. 7 shows a step 702 for selecting a workflow step, according to an example embodiment. FIG. 7 is described with respect to FIG. 8. FIG. 8 shows an example view of ADT GUI 500 after the developer has elected to create a new workflow for control 510. As shown in FIG. 8, second user interface 116 has changed to an interface for configuring a workflow, displaying a begin step 802 (labeled "When Button is Clicked"), a placeholder step 804, and a library of steps 806.

In step 702 of FIG. 7, a step is enabled to be selected for inclusion in the workflow logic from a library of steps, the steps including one or more network-based applications and one or more client applications. As shown in FIG. 8, a developer is enabled to select a workflow step from library of steps 806 to insert into the workflow in the position of placeholder step 804.

Library of steps 806 may include any number of workflow steps. The workflow steps included in library of steps 806 may be associated with network-based applications mentioned elsewhere herein or otherwise known (e.g., Dropbox™), and/or with local applications mentioned elsewhere herein or otherwise known (e.g., Microsoft® Outlook®). Each workflow step is configured for plug-and-place into workflow logic. Each workflow step is configured with the appropriate logic and/or interface(s) to perform its respective function(s), which may include communicating with a local or remote application. For instance, a workflow step may be configured to transmit a query to an application (e.g., a search query to a search engine, a database query to a database, a request for data from a social networking application, etc.), being pre-configured how to properly transmit and format such a request to the application. The workflow step may be configured to receive a response to the request, being pre-configured how to parse the response for desired response data. As such, a developer of a user application does not need to know how to write program code in a programming language, to interface with complex application interfaces (e.g., application programming interfaces (APIs)), or to understand network communication protocols, as the workflow steps are already setup. When a workflow step is plugged into workflow logic by a developer, the developer configures the inputs to the workflow step (as described below), and the otherwise pre-configured workflow step handles any communications with other applications.

The developer may insert a workflow step from library of steps 806 in various ways. For instance, the developer may enter characters in placeholder step 804 (resulting in a natural language search being performed in library of steps 806, returning a list of workflow steps matching the entered characters) or may find a workflow step in library of steps 806 in another manner (e.g., by scrolling through the list of workflow steps, by voice, etc.), and selecting the workflow step (e.g., using a pointer click, by touch, by voice, etc.).

Figure 9:
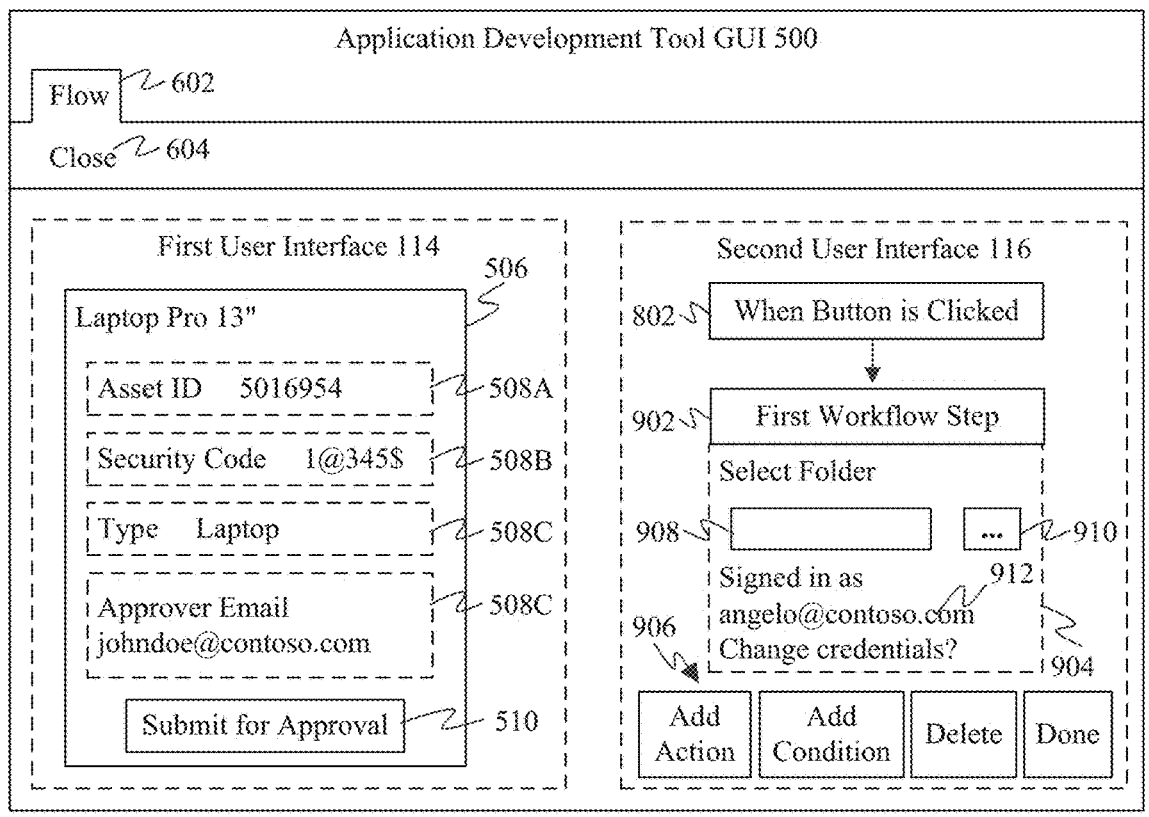

FIG. 9 shows an example view of ADT GUI 500 after the developer has selected a particular workflow step from library of steps 806 to replace placeholder step 804. As shown in FIG. 9, the developer inserted a first workflow step 902 into the workflow as workflow logic. After inserting first workflow step 902, the developer is enabled to configure the input data of first workflow step 902. For instance, as shown in FIG. 9, an input data configuration region 904 may be displayed in association with first workflow step 902. Input data configuration region 904 includes one or more user interface elements (e.g., text input boxes, navigator buttons, etc.) that enable a developer to configure the input data used by first workflow step 902 during runtime. The input data may be persistent data, which always has the same data value during runtime, or may be variable data, which has different values during different runtime iterations of the workflow (e.g., each time that an order is processed, each time a message is sent, etc.).

For instance, in the example of FIG. 9, first workflow step 902 may be a file retrieval application (e.g., Dropbox™). Text input box 908 of first workflow step 902 may indicate a folder location for a file to be retrieved. Thus, the developer may enter a folder location into text input box 908. If the folder location is the same during each runtime iteration of first workflow step 902 (persistent data), the developer may enter an actual folder location into text input box 908 (e.g., by typing, by voice, by navigating to the folder location using navigator button 910, etc.). If the folder location is different during each runtime iteration, the developer may enter a variable into text input box 908. The entered variable indicates a location for file retrieval that may change with each runtime iteration of first workflow step 902. The value of the variable may be tied to an attribute value of a data object displayed in first user interface 114, or may be determined in another manner.

It is noted that in some embodiments, a workflow step, such as first workflow step 902, may require credentials (e.g., a login and password) to access indicated data (e.g., to access a file at the location indicated in text input box 908). As such, the developer may be requested to provide credential information in association with first workflow step 902 so that when first workflow step 902 is performed during runtime, the data may be accessed. As shown in FIG. 9, a control 912 may be provided (e.g., a link, etc.) that enables the developer to enter or change the credentials associated with first workflow step 902. For instance, the developer may touch, click on, etc., control 912 to be enabled to enter and verify the credential information with respect to the associated application.

When the developer has finished configuring first workflow step 902, the developer may interact with controls 906 to continue workflow development. Controls 906 are shown as interactive buttons in FIG. 9, but in other embodiments may have any other form mentioned herein or otherwise known.

For instance, the developer may delete first workflow step 902 by selecting the "Delete" button. The developer may indicate that the workflow is complete by selecting the "Done" button. The developer may add a next workflow step by selecting the "Add Action" button.

Figure 10:
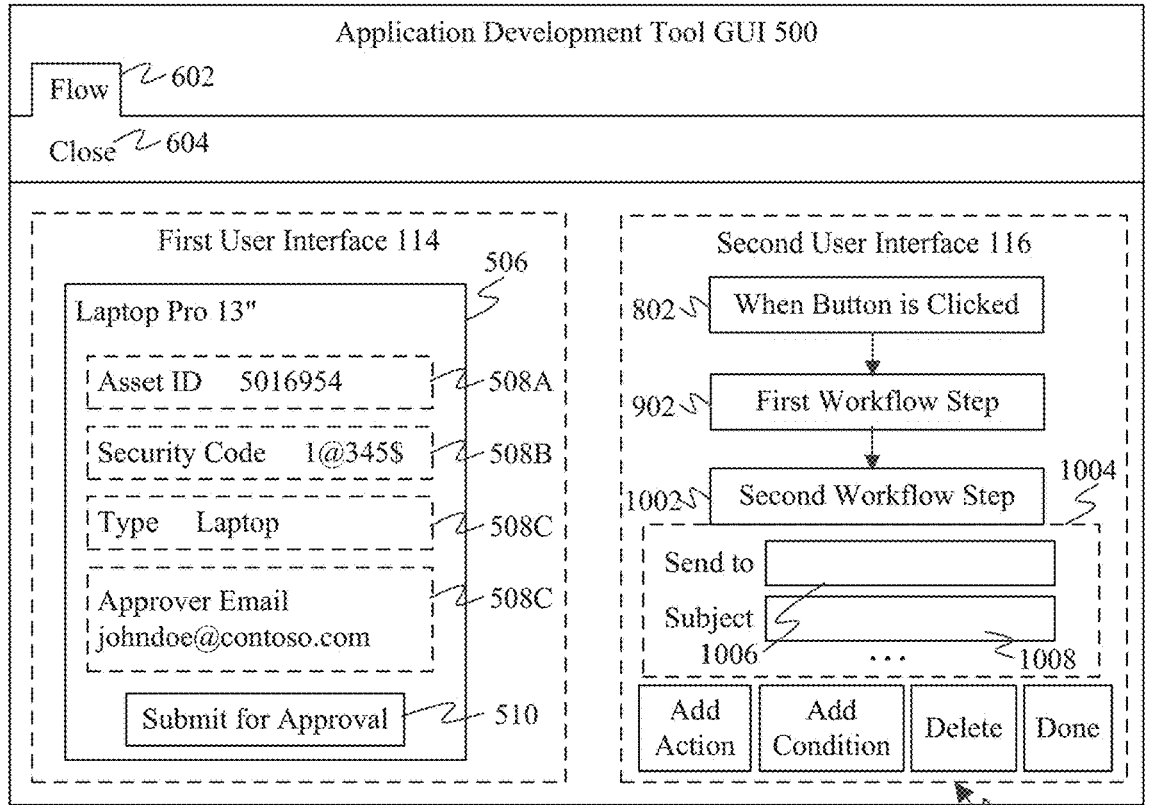

FIG. 10 shows an example view of ADT GUI 500 after the developer has elected to add another workflow step to the workflow. As shown in FIG. 10, the developer selected a second workflow step 1002 (e.g., from library of steps 806 in FIG. 8), which has been entered into the workflow. Second workflow step 1002 is in position to be performed in the workflow runtime after first workflow step 902 is performed. In a similar manner to first workflow step 902, after inserting second workflow step 1002 into the workflow, the developer is enabled to configure its input data. As shown in FIG. 10, an input data configuration region 1004 is displayed in association with second workflow step 1002. Input data configuration region 1004 includes one or more user interface elements that enable a developer to configure the input data used by second workflow step 1002 during runtime. The input data may be persistent data or variable data.

In the example of FIG. 10, second workflow step 1002 may be a messaging application (e.g., Microsoft® Outlook®). Text input box 1006 of second workflow step 1002 may indicate a "send to" location for a message generated by second workflow step 1002 to be sent. The message may include the file accessed during first workflow step 902, for example. Thus, the developer may enter a messaging destination address (e.g., an email address) into text input box 1006 to which a configured message is sent (with the file). If the destination address is the same during each runtime iteration of second workflow step 1002 (persistent data), the developer may enter an actual destination address into text input box 1006. If the destination address is different during each runtime iteration, the developer may enter a variable into text input box 1006 that supports a variable destination address that changes with each runtime iteration of the workflow. Likewise, text input box 1008 of second workflow step 1002 may indicate a "subject" for the message. Thus, the developer may enter subject text into text input box 1008, which may be persistent or variable text. Further fields for second workflow step 1002 may be present but not visible in FIG. 10 (e.g., "Body" text for the message, one or more controls to be included in the message (e.g., an "Approved" button, a "Rejected" button, etc.), etc.).

Figure 12:
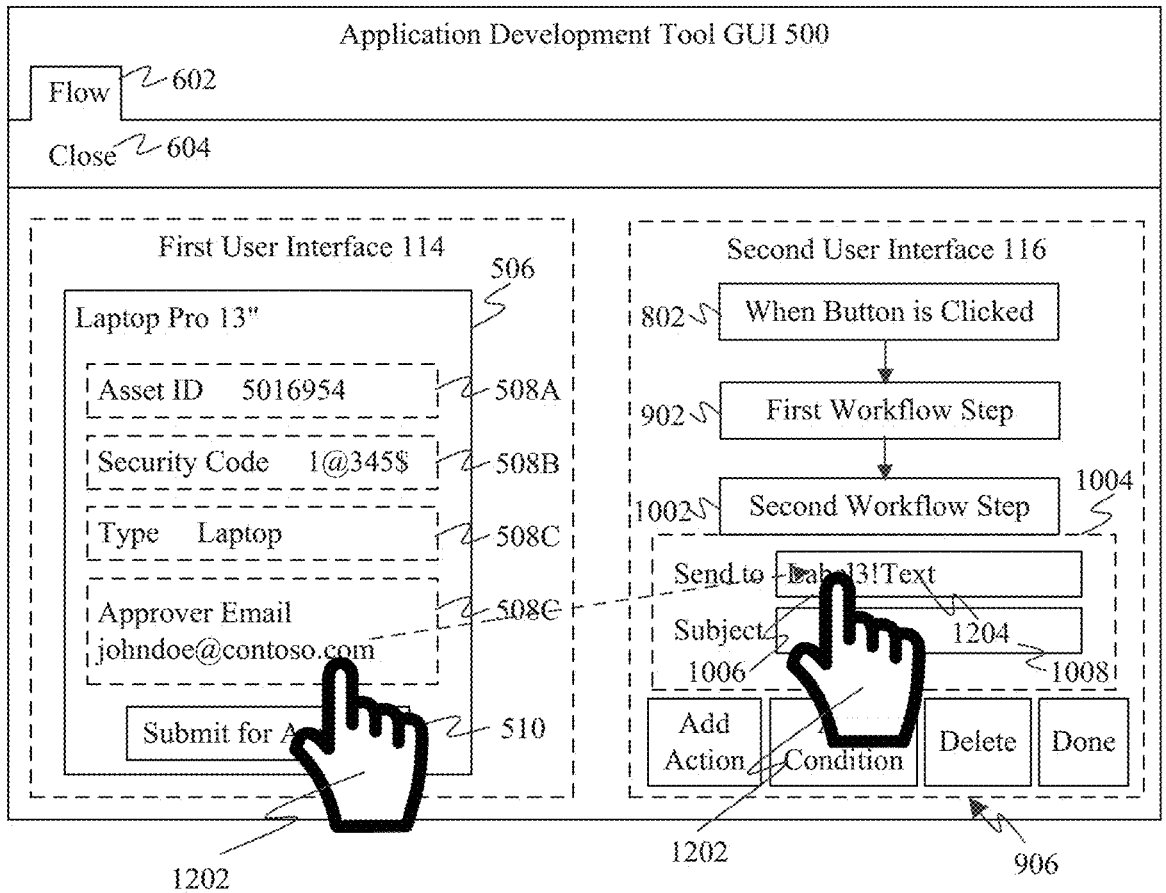

FIGS. 11-13 illustrate techniques for defining input data for a workflow step that leverage the concurrent display of first and second user interfaces 114 and 116.

For instance, FIG. 11 shows a step 1102 for enabling an object in first user interface 114 to be used as input data to a workflow step, according to an example embodiment.

In step 1102, an object in the GUI of the user application displayed in the first user interface is enabled to be selected to use a parameter value of the object as an input to a step of the workflow logic in the second user interface. In embodiments, objects displayed in user application GUI 506 may be selected to be used as inputs to the workflow steps displayed in second user interface 116. Such selection may be made in any manner. For example, a data object in user application GUI 506 may be selected (e.g., by a long touch, a pointer right click, etc.) to cause a pop-up menu to appear that includes a "pass to flow" option. In another example, the data object may be dragged and dropped (by touch or pointer) into the desired control displayed in second user interface 116 for the workflow step.

FIG. 12 shows an example view of ADT GUI 500 illustrating a developer dragging and dropping a data object from user application GUI 506 in first user interface 114 into a workflow step in second user interface 116. FIG. 13 shows a flowchart 1300 providing a process for such a drag-and-drop operation, according to an example embodiment. FIG. 12 is described with respect to flowchart 1300 as follows.

In step 1302 of flowchart 1300, selection of the object in the GUI of the user application is enabled in the first user interface. As shown in FIG. 12, a finger of a developer's hand 1202 touches object 508C in user application GUI 506. Object 508C is a data object that includes one or more parameters, including a parameter name of "approval email" with a corresponding parameter value of "johndoe@contoso.com." By touching object 508C on the display screen, the developer selects object 508C.

In step 1304, dragging of the object to the second user interface is enabled to indicate the parameter value as an input to a step of the workflow logic. As indicated by movement of hand 1202 in FIG. 12, the developer drags object 508C over text input box 1006. The developer may then release object 508C, causing a variable 1204, represented as "Label3!Text", to be dropped into text input box 1006. Variable 1204 indicates that this parameter value of object 508C is variable, having a different value for each order in this example. Accordingly, in this example, a persistent data value is not entered into text input box 1006 (e.g., johndoe@contoso.com). Instead, "Label3!Text" is entered into text input box 1006 so that during each iteration of the workflow on a different order in user interface GUI 506, text input box 1006 will automatically be populated with the corresponding parameter value for the "Approver Email" parameter of object 508C, which is associated with the variable "Label3!Text".

Accordingly, as can be seen from the description of FIGS. 11-13, displaying first user interface 114 (for user application GUI development) concurrently side-by-side with second user interface 116 (for workflow logic development), enables ease of data sharing between the interfaces that is not possible with independent development of user application GUIs and workflows.

It is noted that a variable may be configured for "early binding" or for "late binding." "Early binding" refers to the assignment of data values to variables of a workflow at a time the workflow is triggered by an end user. "Late binding" refers to the assignment of data values to variables of a workflow at a later time during the workflow runtime— when the variables are actually utilized by the corresponding workflow steps. Accordingly, in embodiments, second user interface 116 may enable a variable to be set for early binding or late binding.

Figure 14:
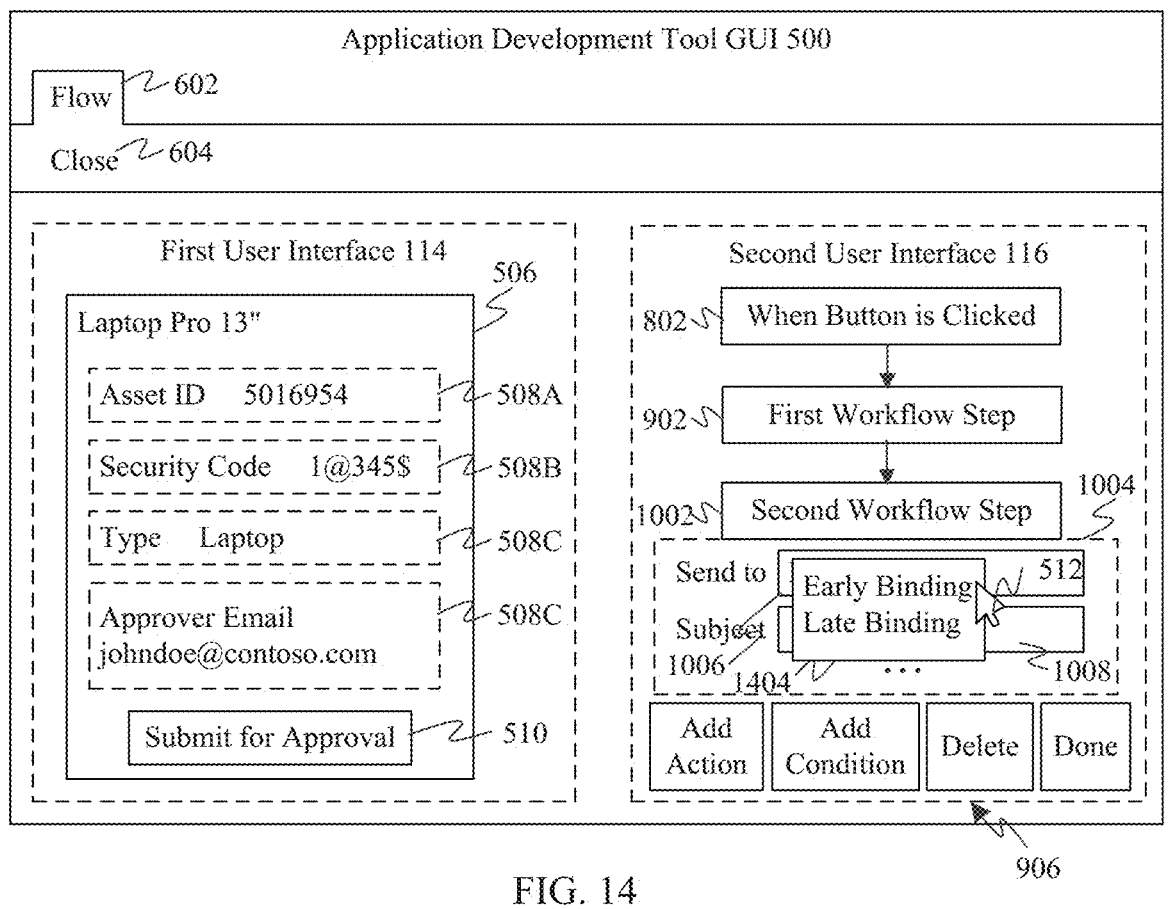

For instance, FIG. 14 shows an example view of ADT GUI 500, illustrating how variable binding may be set. Furthermore, FIG. 15 shows a step 1502 for designating a type of binding for input data to a workflow, according to an example embodiment. FIG. 14 is described with respect to step 1502 as follows.

In step 1502, a variable of the workflow logic is enabled to be designated as early binding or late binding. As described above with respect to FIGS. 11-13, variable 1204 may be assigned to the "Send to" input data text input box 1006. In embodiments, variable 1204 may be set to be early binding or late binding in any manner. For example, as shown in FIG. 14, a developer may select the variable in text box 1006 (by pointer 512, by touch, etc.), and a pop-up menu 1404 may be displayed that enables selection of early binding or late binding. In other embodiments, other techniques and/or controls described elsewhere herein or otherwise known may be used to set early binding or late binding for a variable.

Accordingly, in the above described manner, workflow steps may be selected for inclusion in a workflow. In embodiments, logical elements may be selected for inclusion in a workflow, including arithmetic logic (e.g., summers, multipliers, etc.), conditional logic, etc., that operate based on variable values determined in earlier workflow steps.

Figure 16:
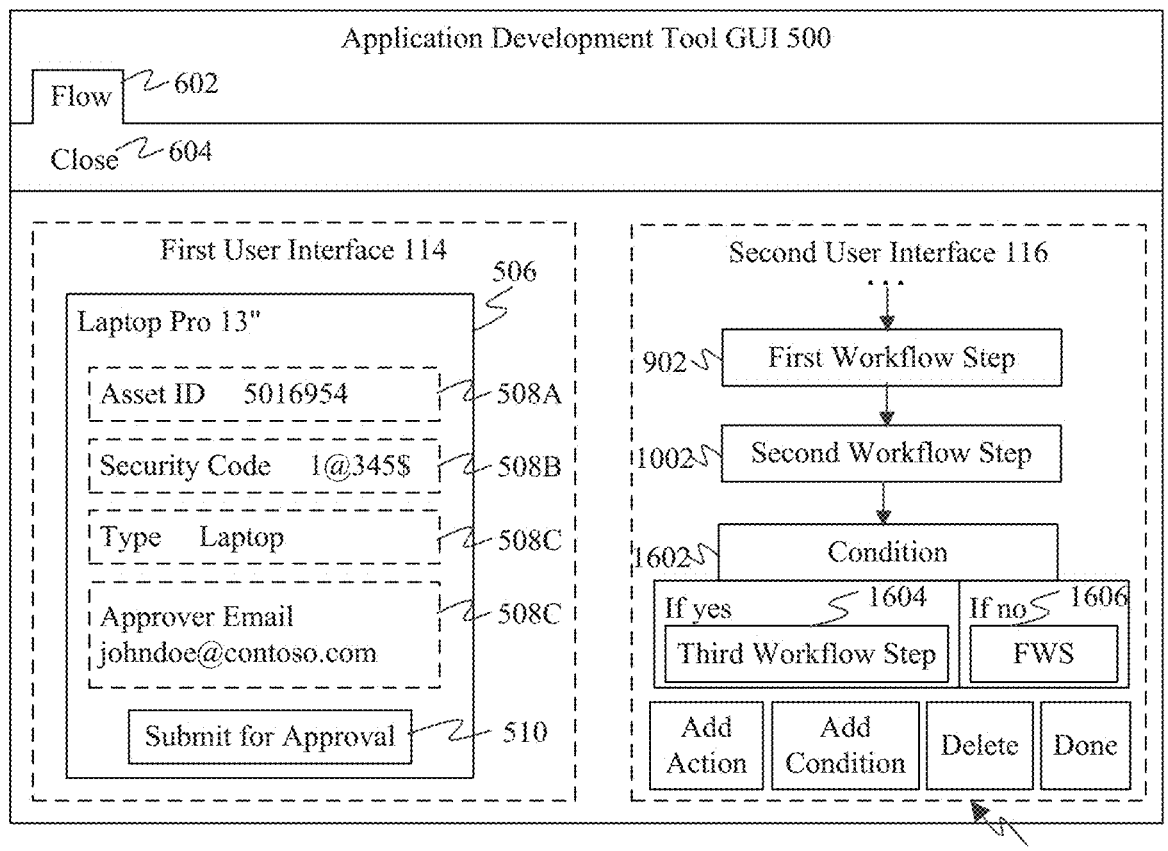

For instance, FIG. 16 shows an example view of ADT GUI 500, illustrating how additional logical elements may be included in a workflow. Furthermore, FIG. 17 shows a step 1702 for incorporating condition logic into a workflow, according to an example embodiment. FIG. 16 is described with respect to step 1702 as follows.

In step 1702, selection of a condition for inclusion in the workflow logic is enabled. For example, as described above with respect to FIG. 9, controls 906 are displayed in second user interface 116. In an embodiment, as shown in FIGS. 9 and 16, controls 906 may include an "Add Condition" button. The developer may interact with the "Add Condition" button to insert a condition into the workflow logic. As shown in FIG. 16, when the developer interacts with (e.g., presses) the "Add Condition" button, a condition step 1602 is added to the workflow logic following the previously configured workflow step. Condition step 1602 enables the workflow logic to fork based on the determination of a condition (e.g., a variable value).

In one illustrative example, the condition of condition step 1602 is whether an approval indication was received from the person at the "Approver Email" address (e.g., johndoe@conteso.com) to which the message of second workflow step 1002 was sent. For example, the message may have contained one or more controls for interaction by the message receiver to indicate their approval or rejection (e.g., of the current order, of the attached file, and/or other information provided by the message). The control may be configured to send a return message (e.g., by link, email, text message, etc.) to the user application. As shown in FIG. 16, the developer has selected a third workflow step 1604 to be performed if an approval is received ("yes"). The developer may select a fourth workflow step (FWS) 1606 to be performed if a rejection is received ("no").

This example of condition step 1602 is provided for purposes of illustration and is not intended to be limiting. Further types of conditional steps may be configured, such as having more than two possible conditions, and/or other types of conditions than yes/no, as would be apparent to persons skilled in the relevant art(s).

In the example of FIG. 16, when the developer has added and configured all of the desired workflow steps in user interface 116, second user interface 116 enables the developer to save and close the workflow by selecting the "Done" button in controls 906, thereby saving workflow logic 120, and may select close option 604 to return to the display of controls 502 (as in FIG. 5). The developer may continue to develop user application GUI 506, and may generate additional workflows associated with controls in user application GUI 506 as desired. When the developer has finished developing the user application, the user may save the user application under the "File" tab. In such case, application packager 310 of FIG. 3 may generate user application 316, which includes user application GUI 118 and workflow logic 120. For example, application packager 310 may package user application 316 in the form of an executable file, a zip file, or other form.

B. Example Runtime Embodiments

According to embodiments, user applications developed as described herein, such as user application 316, may be executed by end users. During operation, an end user may interact with a GUI of the user application, which may lead to workflow logic being executed. The workflow logic may execute locally or at a remote service (in "the cloud"), or may be split such that a first logic portion executes locally while a second logic portion executes at the remote service. The workflow logic may access data of one or more applications, local or network-accessible, as was configured by the developer. Accordingly, the user application performs its intended functions.

FIG. 18 shows a block diagram of a system 1800 for operating a user application that includes one or more workflows, according to an example embodiment. As shown in FIG. 18, system 1800 includes a computing device 1802, first network-based application 124A, second network-based application 124B, and a network-based service 1804. Computing device 1802 includes user application 316 and local application 122. User application 316 includes user application GUI 118 and optionally workflow logic 120. Network-based service 1804 optionally includes workflow logic 120. System 100 is described as follows.

First and second network-based applications 124A and 124B, and network-based service 1804 are each optionally present, depending on the configuration of user application 316. Further network-based applications may be present, depending on the configuration of user application 316.

Computing device 1802 may be any type of stationary or mobile computing device described herein or otherwise known. Computing device 1802 is configured to communicate with first and second network-based applications 124A and 124B and network-based service 1804 over network 126.

An end user of computing device 1802 may execute user application 316 to cause its functions to be performed. For example, user application 316 may be executed as a stand-alone application, a browser-hosted application, or in another form. In one embodiment, all of the functionality of user application 316 may be hosted locally at computing device 1802. In another embodiment, functionality of user application 316 may be hosted at network-based service 1804. For instance, as shown in FIG. 18 (by dotted lines), all of workflow logic 120 may execute at computing device 1802, all of workflow logic 120 may executed at network-based service 1802 (and may pass display information to computing device 1802), or a first portion of workflow logic 120 may execute at computing device 1802 and a second portion of workflow logic 120 may execute at network-based service 1804.

FIG. 19 shows a flowchart 1900 providing a process for executing user application 316, according to an example embodiment. Flowchart 1900 is described as follows with respect to system 1800 of FIG. 18 for illustrative purposes.

Flowchart 1900 begins with step 1902. In step 1902, the user application is executed. In an embodiment, an end user at computing device 1802 may cause user application 316 to be executed, such as by command line, by clicking/tapping or otherwise interacting with an icon representing the application, by selection in a browser, or in another manner.

In step 1904, the user application GUI is displayed. When executed, user application GUI 118 is displayed to the user. The user may interact with user application GUI 118 by reviewing displayed data (e.g., from a file, database record, spreadsheet, or other data structure read by the user application), by entering data into user application GUI 118 (e.g., by typing, by voice, etc.), and/or by interacting with one or more controls displayed in user application GUI 118.

In step 1906, workflow logic is triggered based on an interaction with the user application. When the user interacts with a control in user application GUI 118 that has associated workflow logic 120, the associated workflow logic 120 is executed. As described above, workflow logic 120 may be executed at computing device 1802 and/or at network-based service 120. When executed, the workflow steps of workflow logic 120 are performed in the configured sequence. Accordingly, one or more of the workflow steps may make calls to applications to perform their functions, such as local application 122 (to return data 132), network-based application 124A (to return data 130A), network-based application 124B (to return data 130B), and/or other applications, local or network-based.

Note that variables in workflow logic 120 will bind as configured during development of workflow logic 120 (e.g., as described above with respect to FIGS. 14 and 15). Variables that are configured for early binding will bind with input data when workflow logic 120 is first executed. Variables that are configured for late binding will bind with input data at a time that the variables are used.

In this manner, user application 316 performs its functions, such as processing orders, tracking information, generating messages, processing documents to generate tasks or information, collecting feedback, and/or any other functions.

III. Example Mobile and Stationary Device Embodiments

Computing device 102, application development tool 106, application designer 110, workflow generator 112, local application 122, network-based application 124A, network-based application 124B, data selector 302, GUI formatter 304, control selector 306, behavior assigner 308, application packager 310, step selector 312, input data selector 314, computing device 1802, network-based service 1804, flowchart 200, step 702, step 902, step 1102, flowchart 1300, step 1502, step 1702, and flowchart 1900 may be implemented in hardware, or hardware combined with software and/or firmware. For example, application development tool 106, application designer 110, workflow generator 112, local application 122, network-based application 124A, network-based application 124B, data selector 302, GUI formatter 304, control selector 306, behavior assigner 308, application packager 310, step selector 312, input data selector 314, flowchart 200, step 702, step 902, step 1102, flowchart 1300, step 1502, step 1702, and/or flowchart 1900 may be implemented as computer program code/instructions configured to be executed in one or more processors and stored in a computer readable storage medium. Alternatively, application development tool 106, application designer 110, workflow generator 112, local application 122, network-based application 124A, network-based application 124B, data selector 302, GUI formatter 304, control selector 306, behavior assigner 308, application packager 310, step selector 312, input data selector 314, flowchart 200, step 702, step 902, step 1102, flowchart 1300, step 1502, step 1702, and/or flowchart 1900 may be implemented as hardware logic/electrical circuitry.

For instance, in an embodiment, one or more, in any combination, of application development tool 106, application designer 110, workflow generator 112, local application 122, network-based application 124A, network-based application 124B, data selector 302, GUI formatter 304, control selector 306, behavior assigner 308, application packager 310, step selector 312, input data selector 314, flowchart 200, step 702, step 902, step 1102, flowchart 1300, step 1502, step 1702, and/or flowchart 1900 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

FIG. 20 depicts an exemplary implementation of a computing device 2000 in which embodiments may be implemented. For example, any of computing devices 102 and 1802 and network-based service 1804 may be implemented in one or more computing devices similar to computing device 2000 in stationary or mobile computer embodiments, including one or more features of computing device 2000 and/or alternative features. The description of computing device 2000 provided herein is provided for purposes of illustration, and is not intended to be limiting. Embodiments may be implemented in further types of computer systems, as would be known to persons skilled in the relevant art(s).

As shown in FIG. 20, computing device 2000 includes one or more processors, referred to as processor circuit 2002, a system memory 2004, and a bus 2006 that couples various system components including system memory 2004 to processor circuit 2002. Processor circuit 2002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 2002 may execute program code stored in a computer readable medium, such as program code of operating system 2030, application programs 2032, other programs 2034, etc. Bus 2006 represents one or more of any of several types of bus structures, including a memory bus or memory controller, a peripheral bus, an accelerated graphics port, and a processor or local bus using any of a variety of bus architectures. System memory 2004 includes read only memory (ROM) 2008 and random access memory (RAM) 2010. A basic input/output system 2012 (BIOS) is stored in ROM 2008.

Computing device 2000 also has one or more of the following drives: a hard disk drive 2014 for reading from and writing to a hard disk, a magnetic disk drive 2016 for reading from or writing to a removable magnetic disk 2018, and an optical disk drive 2020 for reading from or writing to a removable optical disk 2022 such as a CD ROM, DVD ROM, or other optical media. Hard disk drive 2014, magnetic disk drive 2016, and optical disk drive 2020 are connected to bus 2006 by a hard disk drive interface 2024, a magnetic disk drive interface 2026, and an optical drive interface 2028, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 2030, one or more application programs 2032, other programs 2034, and program data 2036. Application programs 2032 or other programs 2034 may include, for example, computer program logic (e.g., computer program code or instructions) for implementing application development tool 106, application designer 110, workflow generator 112, local application 122, network-based application 124A, network-based application 124B, data selector 302, GUI formatter 304, control selector 306, behavior assigner 308, application packager 310, step selector 312, input data selector 314, flowchart 200, step 702, step 902, step 1102, flowchart 1300, step 1502, step 1702, and/or flowchart 1900 (including any suitable step of flowcharts 200, 1300, 1900), and/or further embodiments described herein.

A user may enter commands and information into the computing device 2000 through input devices such as keyboard 2038 and pointing device 2040. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 2002 through a serial port interface 2042 that is coupled to bus 2006, but may be connected by other interfaces, such as a parallel port, game port, or a universal serial bus (USB).

A display screen 2044 is also connected to bus 2006 via an interface, such as a video adapter 2046. Display screen 2044 may be external to, or incorporated in computing device 2000. Display screen 2044 may display information, as well as being a user interface for receiving user commands and/or other information (e.g., by touch, finger gestures, virtual keyboard, etc.). In addition to display screen 2044, computing device 2000 may include other peripheral output devices (not shown) such as speakers and printers.

Computing device 2000 is connected to a network 2048 (e.g., the Internet) through an adaptor or network interface 2050, a modem 2052, or other means for establishing communications over the network. Modem 2052, which may be internal or external, may be connected to bus 2006 via serial port interface 2042, as shown in FIG. 20, or may be connected to bus 2006 using another interface type, including a parallel interface.

As used herein, the terms "computer program medium," "computer-readable medium," and "computer-readable storage medium" are used to refer to physical hardware media such as the hard disk associated with hard disk drive 2014, removable magnetic disk 2018, removable optical disk 2022, other physical hardware media such as RAMs, ROMs, flash memory cards, digital video disks, zip disks, MEMs, nanotechnology-based storage devices, and further types of physical/tangible hardware storage media (including memory 1220 of FIG. 12). Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 2032 and other programs 2034) may be stored on the hard disk, magnetic disk, optical disk, ROM, RAM, or other hardware storage medium. Such computer programs may also be received via network interface 2050, serial port interface 2042, or any other interface type. Such computer programs, when executed or loaded by an application, enable computing device 2000 to implement features of embodiments discussed herein. Accordingly, such computer programs represent controllers of the computing device 2000.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

V. Further Example Embodiments

In one embodiment, a method in a computing device comprises: providing a first user interface on a display screen that enables a graphical user interface (GUI) of a user application to be configured, including enabling controls to be selected for inclusion in the GUI of the user application, and enabling workflow logic to be associated with a control included in the GUI of the user application; and providing a second user interface on the display screen concurrent with the first user interface that enables the workflow logic to be generated, including enabling selection of one or more steps for inclusion in the workflow logic, and configuring each step of the workflow logic to operate on at least one of data entered via the GUI of the user application or data of another step of the workflow logic.

In an embodiment, the providing a second user interface on the display screen concurrent with the first user interface that enables the workflow logic to be generated comprises: enabling selection of a step for inclusion in the workflow logic from a library of steps, the steps including one or more network-based applications and one or more client applications.

In an embodiment, the providing a second user interface on the display screen concurrent with the first user interface that enables the workflow logic to be generated comprises: enabling selection of a condition for inclusion in the workflow logic.

In an embodiment, the method further comprises: enabling a variable of the workflow logic to be designated as early binding or late binding.

In an embodiment, the configuring each step of the workflow logic to operate on at least one of data entered via the GUI of the user application or data of another step of the workflow logic comprises: enabling selection of an object in the GUI of the user application displayed in the first user interface to use a parameter value of the object as an input to a step of the workflow logic in the second user interface.

In an embodiment, the enabling selection of an object in the GUI of the user application displayed in the first user interface to use a parameter value of the object as an input to a step of the workflow logic in the second user interface comprises: enabling, in the first user interface, selection of the object in the GUI of the user application; and enabling dragging of the object to the second user interface to indicate the parameter value as an input to a step of the workflow logic.

In an embodiment, the enabling workflow logic to be associated with a control included in the GUI of the user application comprises: selecting the control in the GUI of the user application; selecting a run workflow behavior for the selected control; and in response to selecting the run workflow behavior for the control, enabling a selection of new workflow logic to be created for association with the selected control, and enabling a selection of existing workflow logic for association with the selected control from a workflow logic library.

In another embodiment, a system for developing user applications comprises: at least one processor circuit; and at least one memory that stores program code configured to be executed by the at least one processor circuit, the program code comprising: an application designer configured to provide a first user interface on a display screen that enables a graphical user interface (GUI) of a user application to be configured, including, the application designer including a control selector configured to enable controls to be selected for inclusion in the GUI of the user application, and a behavior assigner configured to enable workflow logic to be associated with a control included in the GUI of the user application; and a workflow generator configured to provide a second user interface on the display screen concurrent with the first user interface that enables the workflow logic to be generated, the workflow generator including a step selector configured to enable selection of one or more steps for inclusion in the workflow logic, and an input data selector configured to enable each step of the workflow logic to operate on at least one of data entered via the GUI of the user application or data of another step of the workflow logic.

In an embodiment, the step selector is configured to enable selection of a step for inclusion in the workflow logic from a library of steps, the steps including one or more network-based applications and one or more client applications.

In an embodiment, the step selector is configured to enable selection of a condition for inclusion in the workflow logic.

In an embodiment, for a step that is a network-based application that has associated network-based data, the input data selector is configured to retrieve the network-based data from the network-based application during development time, and bind the retrieved data with the workflow logic.

In an embodiment, the input data selector is configured to enable a variable of the workflow logic to be designated as early binding or late binding.

In an embodiment, the input data selector is configured to enable selection of an object in the GUI of the user application displayed in the first user interface to use a parameter value of the object as an input to a step of the workflow logic in the second user interface.

In an embodiment, the input data selector is configured to enable, in the first user interface, selection of the object in the GUI of the user application, and enable dragging of the object to the second user interface to indicate the parameter value as an input to a step of the workflow logic.

In an embodiment, the behavior assigner is configured to enable selection of the control in the GUI of the user application, and enable a run workflow behavior for the selected control in the user application; and in response to selecting the run workflow behavior for the control, the behavior assigner is configured to enable a selection of new workflow logic to be created for association with the selected control, and enable a selection of existing workflow logic for association with the selected control from a workflow logic library.

In another embodiment, a computer-readable storage medium comprises computer-executable instructions that, when executed by a processor, perform a method comprising: providing a first user interface on a display screen that enables a graphical user interface (GUI) of a user application to be configured, including enabling controls to be selected for inclusion in the GUI of the user application, and enabling workflow logic to be associated with a control included in the GUI of the user application; and providing a second user interface on the display screen concurrent with the first user interface that enables the workflow logic to be generated, including enabling selection of one or more steps for inclusion in the workflow logic, and configuring each step of the workflow logic to operate on at least one of data entered via the GUI of the user application or data of another step of the workflow logic.

In an embodiment, the providing a second user interface on the display screen concurrent with the first user interface that enables the workflow logic to be generated comprises: enabling selection of a step for inclusion in the workflow logic from a library of steps, the steps including one or more network-based applications and one or more client applications.

In an embodiment, the providing a second user interface on the display screen concurrent with the first user interface that enables the workflow logic to be generated comprises: enabling selection of a condition for inclusion in the workflow logic.

In an embodiment, the method further comprises: enabling a variable of the workflow logic to be designated as early binding or late binding.

In an embodiment, the configuring each step of the workflow logic to operate on at least one of data entered via the GUI of the user application or data of another step of the workflow logic comprises: enabling, in the first user interface, selection of the object in the GUI of the user application; and enabling dragging of the object to the second user interface to indicate the parameter value as an input to a step of the workflow logic.

In an embodiment, the enabling workflow logic to be associated with a control included in the GUI of the user application comprises: selecting the control in the GUI of the user application; selecting a run workflow behavior for the selected control; and in response to selecting the run workflow behavior for the control, enabling a selection of new workflow logic to be created for association with the selected control, and enabling a selection of existing workflow logic for association with the selected control from a workflow logic library.

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method in a computing device, comprising:
providing a first user interface on a display screen that enables a graphical user interface (GUI) of a user application to be configured, the first user interface provided in a window of the user application displayed in the displayed screen, including
receiving selection of a control displayed in the first user interface provided in the window for inclusion in the GUI of the user application, and
associating workflow logic with the control based at least in part on an interaction with the control displayed inside the GUI of the user application in the first user interface provided in the window; and
providing a second user interface on the display screen that enables the workflow logic to be configured, the second user interface provided in the window of the user application concurrent with the first user interface, including
receiving selection of a step displayed as a selectable graphical object within the second user interface provided in the window concurrent with the first user interface for inclusion in the workflow logic, and
receiving selection of an object in the GUI of the user application displayed in the first user interface to use a parameter value of the object as an input to a step of the workflow logic in the second user interface.

2. The method of claim 1, wherein said providing a second user interface on the display screen that enables the workflow logic to be configured comprises:
receiving the selection of the step displayed as a selectable graphical object within the second user interface provided in the window concurrent with the first user interface for inclusion in the workflow logic from a library of steps, the steps including one or more network-based applications and one or more client applications.

3. The method of claim 1, wherein said providing a second user interface on the display screen that enables the workflow logic to be configured comprises:
receiving selection of a condition for inclusion in the workflow logic.

4. The method of claim 1, further comprising:
enabling a variable of the workflow logic to be designated as early binding or late binding.

5. The method of claim 1, wherein said receiving selection of an object in the GUI of the user application displayed in the first user interface to use a parameter value of the object as an input to a step of the workflow logic in the second user interface comprises:
receiving, in the first user interface, selection of the object in the GUI of the user application; and
receiving an indication of dragging of the object to the second user interface, said dragging indicating the parameter value as an input to a step of the workflow logic.

6. The method of claim 1, wherein said associating workflow logic with the control based at least in part on an interaction with the control displayed inside the GUI of the user application in the first user interface provided in the window comprises:
receiving selection of the control in the GUI of the user application;
receiving selection of a run workflow behavior for the selected control; and
in response to receiving the selection of the run workflow behavior for the control,
displaying a control to enable a selection of new workflow logic to be created for association with the selected control, and
displaying a control to enable a selection of existing workflow logic for association with the selected control from a workflow logic library.

7. A system for developing user applications, comprising:
at least one processor circuit; and
at least one memory that stores program code configured to be executed by the at least one processor circuit, the program code comprising:
an application designer configured to provide a first user interface on a display screen that enables a graphical user interface (GUI) of a user application to be configured, the first user interface provided in a window of the user application displayed in the display screen, including, the application designer including
a control selector configured to receive selection of a control displayed in the first user interface provided in the window for inclusion in the GUI of the user application, and
a behavior assigner configured to associate workflow logic with the control based at least in part on an interaction with the control displayed inside the GUI of the user application in the first user interface provided in the window; and
a workflow generator configured to provide a second user interface on the display screen that enables the workflow logic to be configured, the second user interface provided in the window of the user application concurrent with the first user interface, the workflow generator including
a step selector configured to receive selection of a step displayed as a selectable graphical object within the second user interface provided in the window concurrent with the first user interface for inclusion in the workflow logic, and
an input data selector configured to receive selection of an object in the GUI of the user application displayed in the first user interface to use a parameter value of the object as an input to a step of the workflow logic in the second user interface.

8. The system of claim 7, wherein the step selector is configured to receive selection of the step displayed as a selectable graphical object within the second user interface provided in the window concurrent with the first user interface for inclusion in the workflow logic from a library of steps, the steps including one or more network-based applications and one or more client applications.

9. The system of claim 8, wherein the step selector is configured to receive selection of a condition for inclusion in the workflow logic.

10. The system of claim 7, wherein the step is a network-based application that has associated network-based data and the input data selector is configured to retrieve the network-based data from the network-based application during development time, and bind the retrieved data with the workflow logic.

11. The system of claim 7, wherein the input data selector is configured to receive, in the first user interface, selection of the object in the GUI of the user application, and receive an indication of dragging of the object to the second user interface, the dragging indicating the parameter value as an input to a step of the workflow logic.

12. The system of claim 7, wherein the behavior assigner is configured to receive selection of the control in the GUI of the user application, and receive selection of a run workflow behavior for the selected control in the user application; and
in response to receiving the selection of the run workflow behavior for the control, the behavior assigner is configured to display a control to enable a selection of new workflow logic to be created for association with the selected control, and display a control to enable a selection of existing workflow logic for association with the selected control from a workflow logic library.

13. A computer-readable storage medium comprising computer-executable instructions that, when executed by a processor, perform a method comprising:
providing a first user interface on a display screen that enables a graphical user interface (GUI) of a user application to be configured, the first user interface provided in a window of the user application displayed in the displayed screen, including
receiving selection of a control displayed in the first user interface provided in the window for inclusion in the GUI of the user application, and
associating workflow with the control based at least in part on an interaction with the control displayed inside the GUI of the user application in the first user interface provided in the window; and
providing a second user interface on the display screen that enables the workflow logic to be configured, the second user interface provided in the window of the user application concurrent with the first user interface, including
receiving selection of a step displayed as a selectable graphical object within the second user interface provided in the window concurrent with the first user interface for inclusion in the workflow logic, and
receiving selection of an object in the GUI of the user application displayed in the first user interface to use a parameter value of the object as an input to a step of the workflow logic in the second user interface.

14. The computer-readable storage medium of claim 13, wherein said providing a second user interface on the display screen that enables the workflow logic to be configured comprises:
receiving selection of the step displayed as a selectable graphical object within the second user interface provided in the window concurrent with the first user interface for inclusion in the workflow logic from a library of steps, the steps including one or more network-based applications and one or more client applications.

15. The computer-readable storage medium of claim 13, wherein said providing a second user interface on the display screen that enables the workflow logic to be configured comprises:
receiving selection of a condition for inclusion in the workflow logic.

16. The computer-readable storage medium of claim 13, the method further comprising:
enabling a variable of the workflow logic to be designated as early binding or late binding.

17. The computer-readable storage medium of claim 13, wherein said receiving selection of an object in the GUI of the user application displayed in the first user interface to use a parameter value of the object as an input to a step of the workflow logic in the second user interface comprises:
receiving, in the first user interface, selection of the object in the GUI of the user application; and
receiving an indication of dragging of the object to the second user interface, said dragging indicating the parameter value as an input to a step of the workflow logic.

18. The computer-readable storage medium of claim 13, wherein said associating workflow logic with the control based at least in part on an interaction with the control displayed inside the GUI of the user application in the first user interface provided in the window comprises:
receiving selection of the control in the GUI of the user application;
receiving selection of a run workflow behavior for the selected control; and
in response to receiving selection of the run workflow behavior for the control, displaying a control to enable a selection of new workflow logic to be created for association with the selected control, and displaying a control to enable a selection of existing workflow logic for association with the selected control from a workflow logic library.

19. The method of claim 1, wherein said receiving selection of an object in the GUI of the user application displayed in the first user interface to use a parameter value of the object as an input to a step of the workflow logic in the second user interface comprises:

receiving, in the first user interface, selection of the object in the GUI of the user application; and presenting a pop-up menu that includes an option to pass the parameter value to the step of the workflow logic.

20. The system of claim 7, wherein the input data selector is configured to receive, in the first user interface, selection of the object in the GUI of the user application, and present a pop-up menu that includes an option to pass the parameter value to the step of the workflow logic.

* * * * *